(12) United States Patent
Szmuk et al.

(10) Patent No.: US 11,394,335 B1
(45) Date of Patent: Jul. 19, 2022

(54) SENSOR-LESS MOTOR REVERSAL APPARATUS

(71) Applicant: Amazon Technologies, Inc., Seattle, WA (US)

(72) Inventors: Michael Szmuk, Seattle, WA (US); Marco Antonio De Barros Ceze, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 303 days.

(21) Appl. No.: 16/835,072

(22) Filed: Mar. 30, 2020

(51) Int. Cl.
*H02P 29/00* (2016.01)
*B64D 27/24* (2006.01)
*B64C 39/02* (2006.01)

(52) U.S. Cl.
CPC ........ *H02P 29/0027* (2013.01); *B64C 39/024* (2013.01); *B64D 27/24* (2013.01); *B64C 2201/042* (2013.01)

(58) Field of Classification Search
CPC .............. H02P 29/0027; B64C 39/024; B64C 2201/042; B64D 27/24
USPC ......................................................... 318/10
See application file for complete search history.

(56) References Cited

U.S. PATENT DOCUMENTS

| | | | |
|---|---|---|---|
| 11,177,746 B1 * | 11/2021 | Szmuk ................... | B64D 27/24 |
| 2015/0008857 A1 | 1/2015 | Firanski et al. | |
| 2017/0133957 A1 | 5/2017 | Tillotson et al. | |
| 2018/0186464 A1 | 7/2018 | Woodworth et al. | |

* cited by examiner

*Primary Examiner* — Kawing Chan
(74) *Attorney, Agent, or Firm* — Athorus, PLLC

(57) ABSTRACT

Described is a sensor-less motor reversal ("SLMR") apparatus that aids the reversal of motor rotation of a bidirectional motor, such as a brushless DC motor of an aerial vehicle. The SLMR includes an RPM dependent clutch that is rotated by a drive shaft of the motor and that engages an engageable shaft of the SLMR apparatus during a low RPM range of the motor during which indirect measurement of the RPM of the motor through a back-EMF of the motor is unreliable. As the engageable shaft increases in RPM, energy is stored by an energy storage mechanism of the SLMR. As the RPM of the motor decreases as part of a motor reversal, the energy stored by the energy storage mechanism is discharged and aids in the transition of the reversal of the motor from positive to negative, or negative to positive. As described, the SLMR apparatus is stateless.

20 Claims, 17 Drawing Sheets

SENSOR-LESS MOTOR REVERSAL APPARATUS

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground-based units are often used in materials handling facilities to autonomously transport inventory within the facility. While there are many beneficial uses of these vehicles, balancing the tightly coupled vehicle performance parameters of stability, maneuverability, and energy efficiency introduces design complexities. For example, due to current design limitations, design tradeoffs exist between optimizing UAVs for high agility versus high energy efficiency. Likewise, aerial vehicles are designed to only operate with four degrees of freedom—pitch, yaw, roll, and heave. In addition, aerial vehicles are generally designed assuming a fully operational state. Accordingly, there is a need for systems and methods to maintain control and safety of aerial vehicles even in degraded operational states and/or to selectively increase the agility and/or maneuverability of the aerial vehicle.

DETAILED DESCRIPTION

This disclosure describes a sensor-less motor reversal ("SLMR") apparatus that may be used to aid in the reversal of the rotation of motors, such as brushless DC motors of an aerial vehicle. For example, the disclosed implementations of the SLMR apparatus may be utilized to aid the reversal of the rotational direction of motors included on any type of aerial vehicles, such as UAVs (e.g., quad-rotor, hex-rotor, hepta-rotor, octa-rotor), manned aerial vehicles, etc. The disclosed implementations may be particularly useful to enhance the stability, agility, and/or maneuverability of a hex-rotor aerial vehicle.

As discussed further below, implementations of the SLMR apparatus as described herein may include one or more of a revolutions per minute ("RPM") dependent clutch (also referred to herein as an inverted centrifugal clutch), an engageable shaft, an energy storage mechanism, a latch, and a latch release mechanism that work together to store and/or release potential energy to aid in a transition of a rotation of the drive shaft of the motor to which the SLMR apparatus is attached through a low RPM range and from either a positive direction to a negative direction, or from a negative direction to a positive direction. As discussed further below, the low RPM range, as used herein, is a range of RPMs of the motor for which measurement of the RPM of the motor using the back-EMF of the motor is unreliable. For example, the low RPM range may be between 500 RPM in the positive direction and 500 RPM in the negative direction. In other implementations, the low RPM range may be higher or lower depending on, for example, the motor, the windings in the motors, etc. Likewise, while the example RPM range provided above is symmetrical around zero RPM, in other implementations, the RPM range may be higher or lower in the positive or negative direction than the opposing direction.

The described implementations of the SLMR apparatus may be used to aid in reversing the rotational direction of a sensor-less Electronic Speed Controller ("ESC")/Brushless DC ("BLDC") motor system for a multi-rotor aerial vehicle. As discussed herein, reversing the rotational direction means changing the rotational direction of the drive shaft from either positive rotation to a negative rotation, or from a negative rotation to a positive rotation. Additionally, the SLMR apparatus may be stateless such that it may be initiated in either the positive direction or the negative direction.

Figure 1:
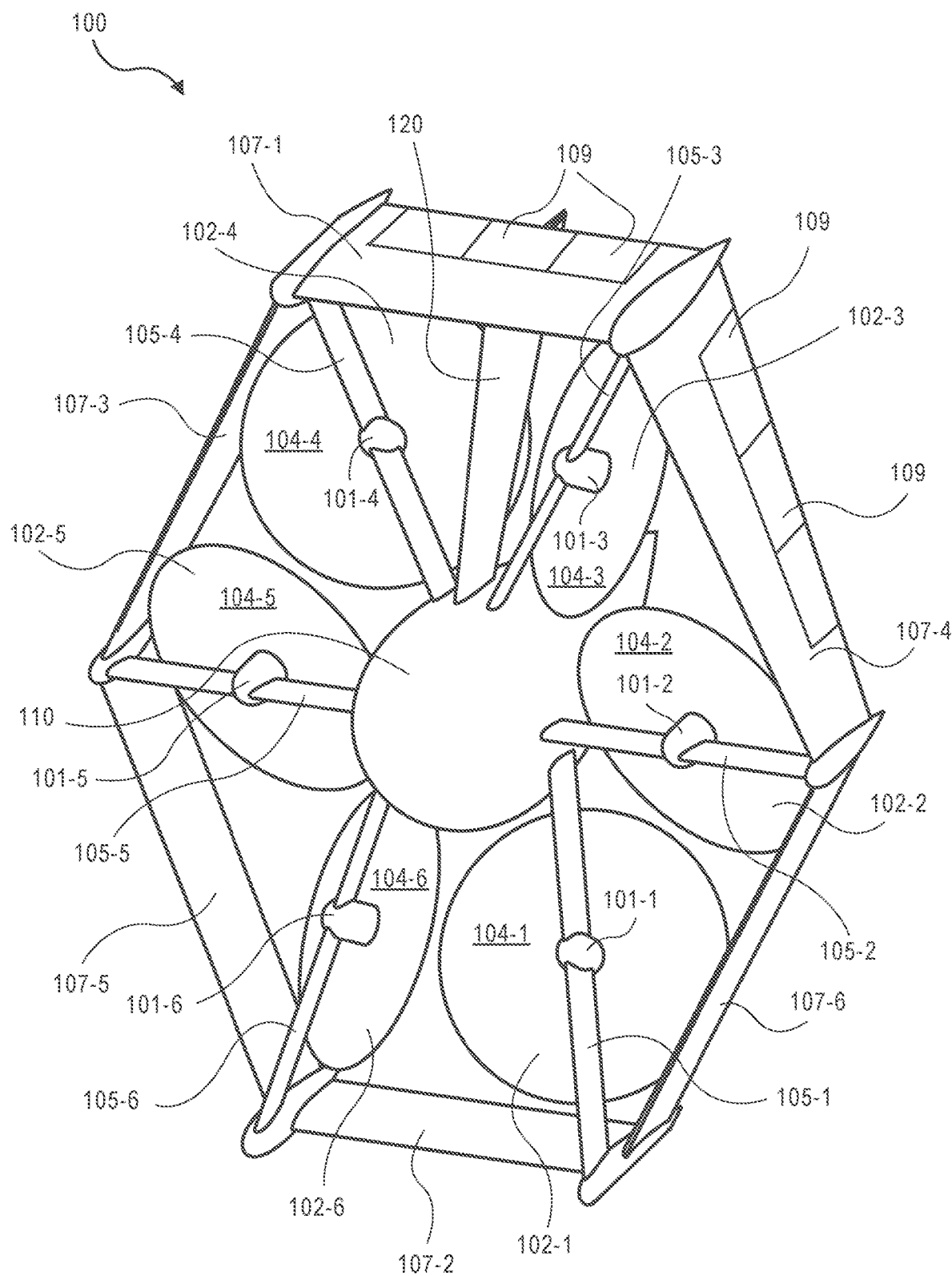
FIGS. 1-4 illustrate various views of an aerial vehicle with a substantially hexagonal shaped ring wing, in accordance with disclosed implementations.

FIG. 1 illustrates a view of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. As illustrated, the propulsion mechanisms 102 include motors 101-1, 101-2, 101-3, 101-4, 101-5, and 101-6 and propellers 104-1, 104-2, 104-3, 104-4, 104-5, and 104-6. Likewise, some or all of the propulsion mechanism may include a SLMR apparatus, in accordance with the disclosed implementations. In selected implementations, propulsion mechanisms (e.g., 102-1, 102-2, 102-3, 102-4, 102-5, and 102-6) may be configured such that their individual orientations may be dynamically modified (e.g., change from vertical to horizontal flight orientation or any position therebetween). Likewise, the implementations of the SLMR apparatus described herein may be used to aid in reversal of the rotational direction of the drive shaft of the motor, thus providing the ability for the propulsion mechanism to generate thrust in either a positive direction or a negative direction.

In the implementation illustrated in FIG. 1, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other implementations, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
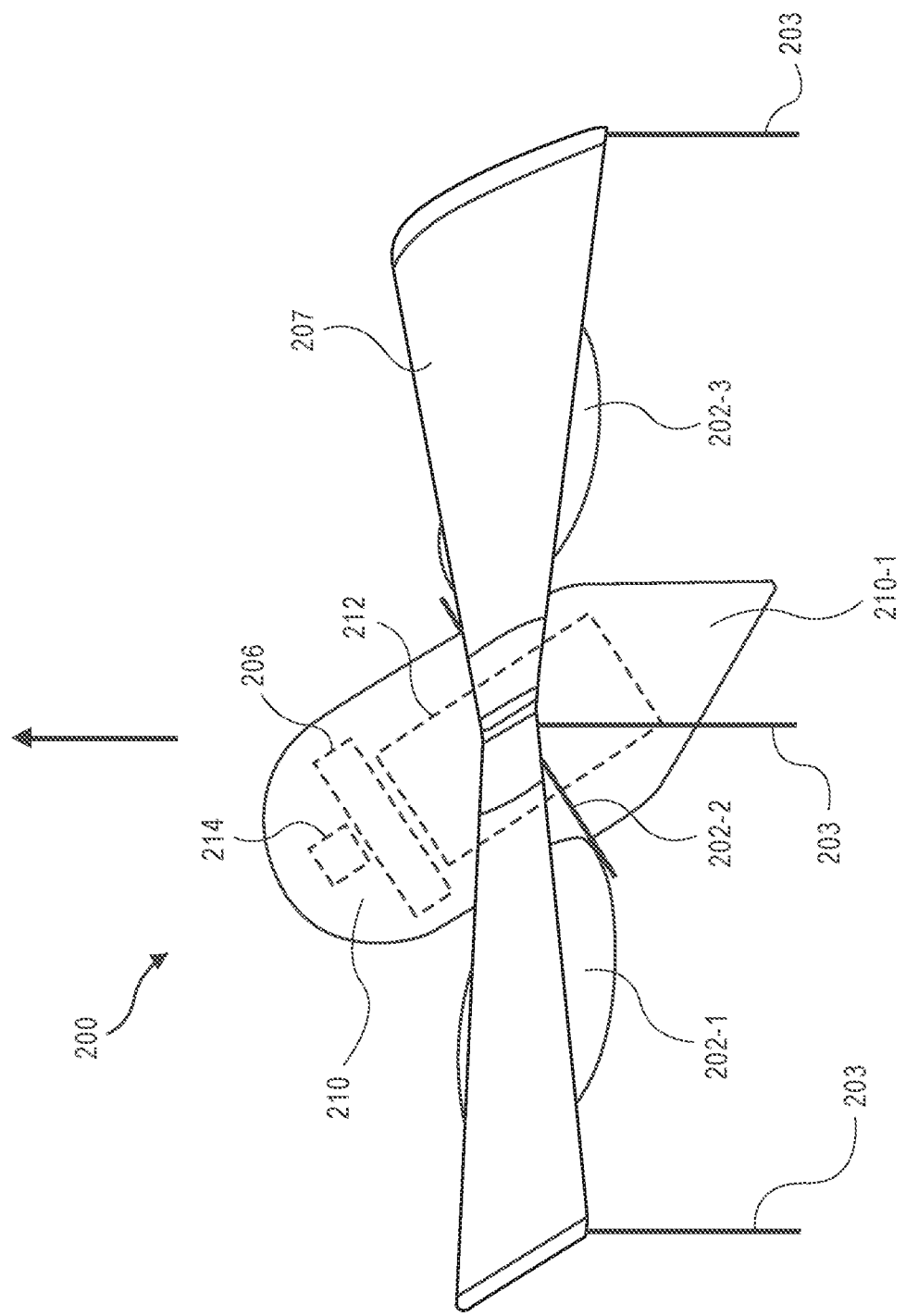

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
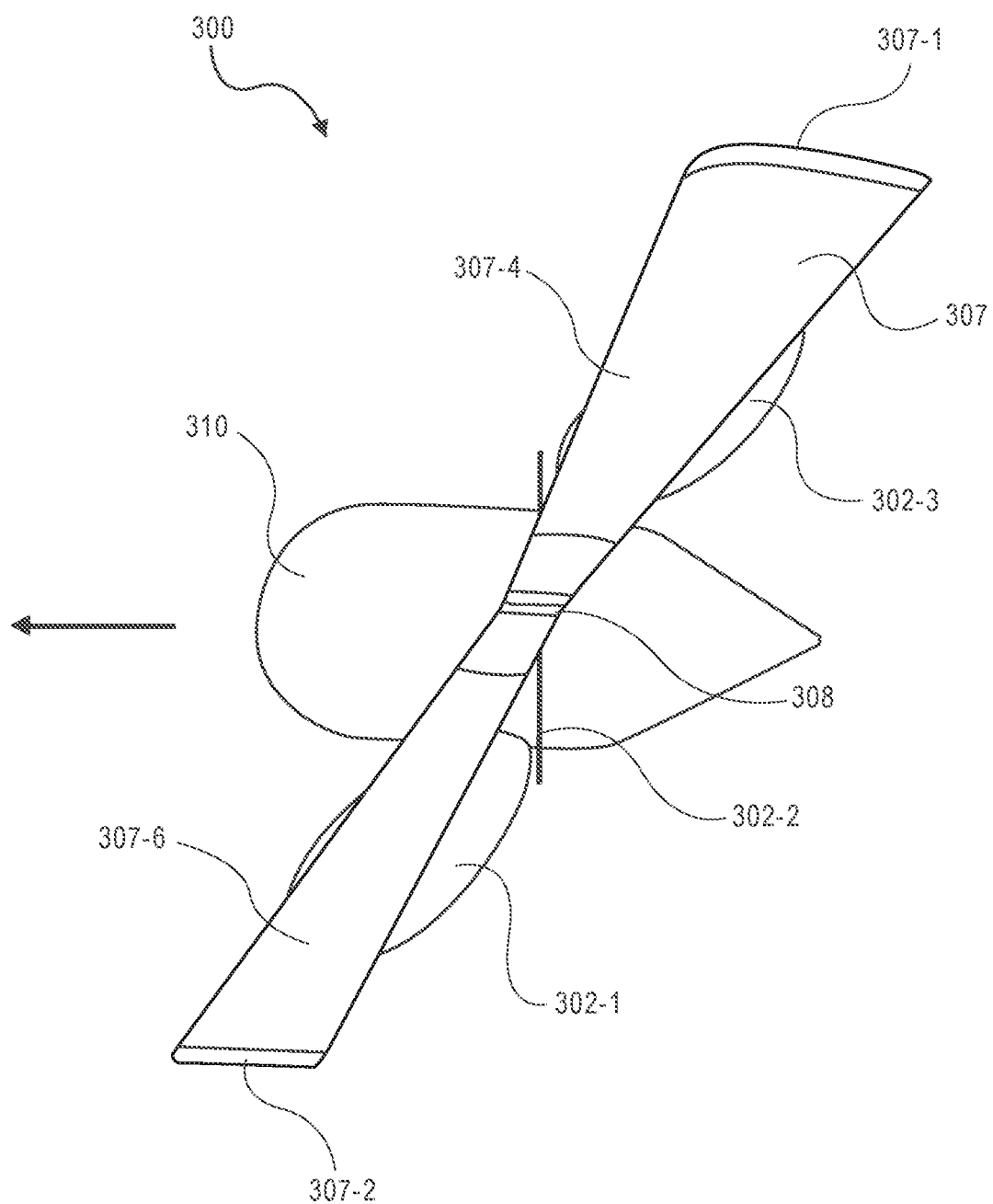

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanism 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger top segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
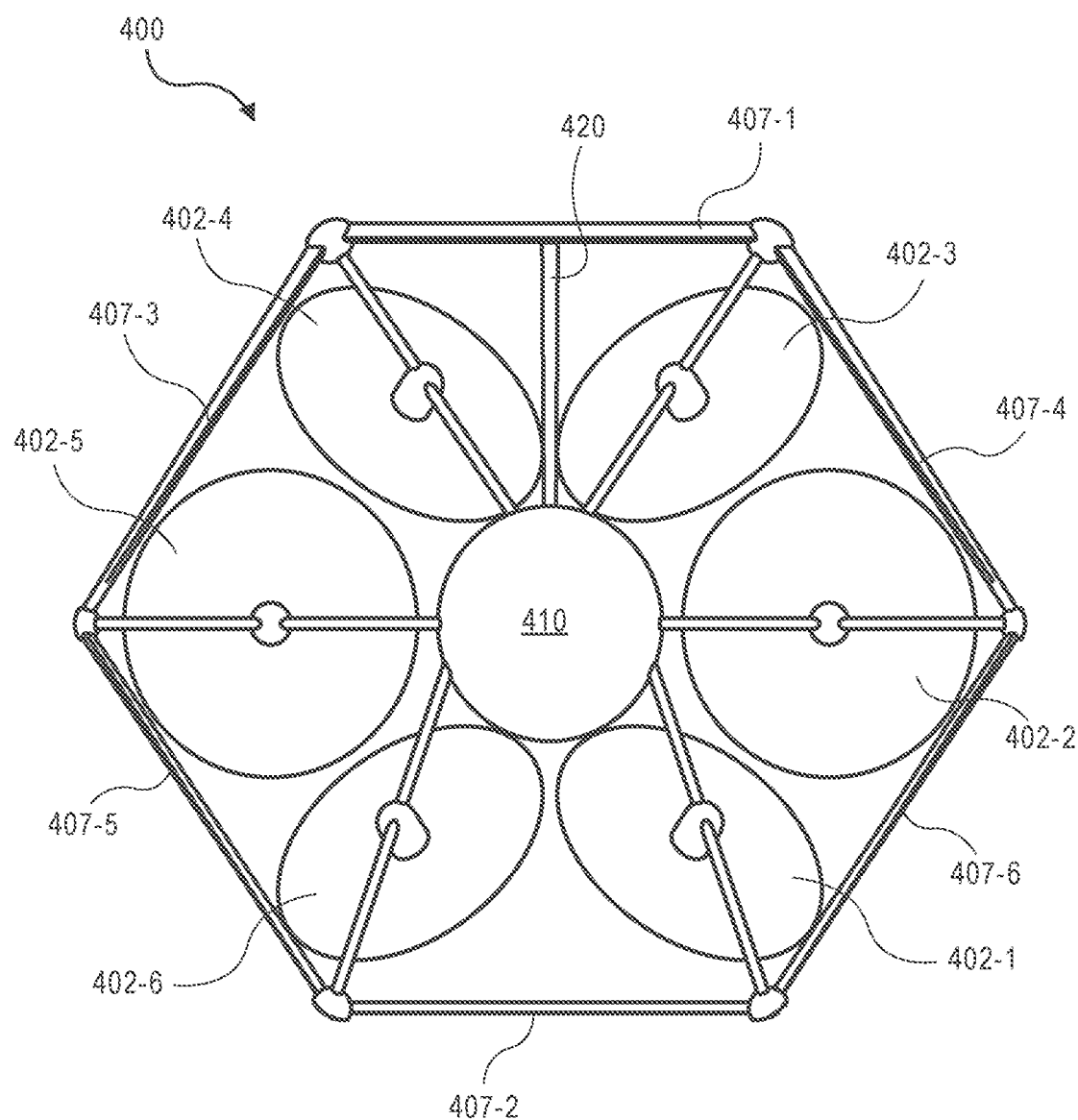

FIG. 4 is a front-on view of an aerial vehicle 400 with a ring wing 407 having a substantially hexagonal shape, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

Figure 5:
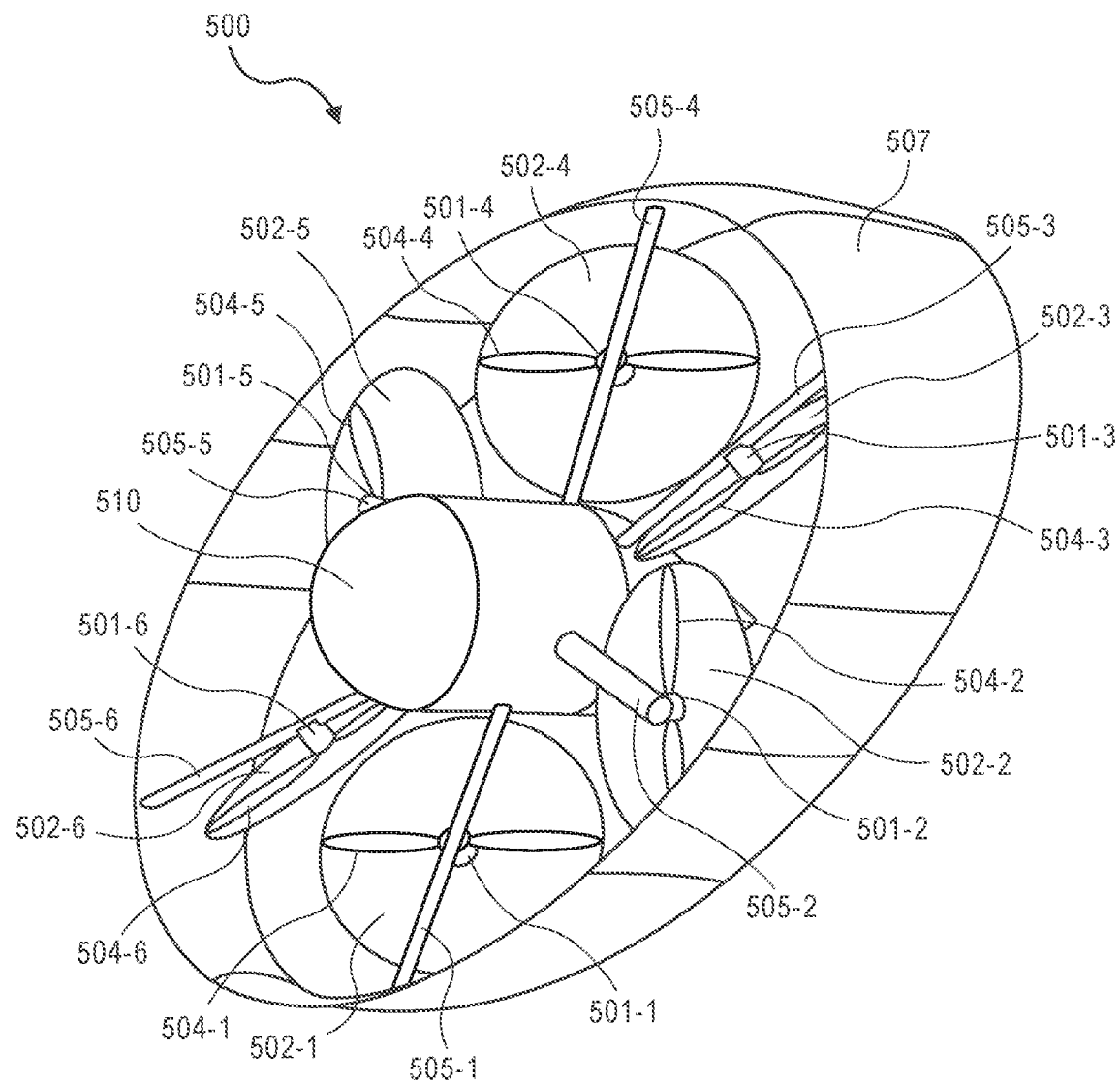
FIG. 5 illustrates a view of an aerial vehicle with a substantially circular shaped ring wing, in accordance with disclosed implementations.

In some implementations, the hexagonal shaped ring wing may decrease manufacturing costs, provide for more stable flight, and provide flatter surfaces upon which control elements, such as ailerons, may be included, in comparison to a substantially circular shaped ring wing as described herein with respect to FIG. 5. Likewise, other components may be coupled to the surface of the ring wing. Other components include, but are not limited to, sensors, imaging elements, range finders, identifying markers, navigation components, such as global positioning satellite antennas, antennas, etc.

To transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

By orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

FIG. 5 illustrates a view of an aerial vehicle 500 with a ring wing that is substantially cylindrical or circular in shape and that surrounds a plurality of propulsion mechanisms, in accordance with disclosed implementations. The aerial vehicle 500 includes six motors 501-1, 501-2, 501-3, 501-4, 501-5, and 501-6 and corresponding propellers 504-1, 504-2, 504-3, 504-4, 504-5, and 504-6 spaced about the fuselage 510 of the aerial vehicle 500. The propellers 504 may be any form of propeller (e.g., graphite, carbon fiber) and of any size. For example, the propellers may be 10 inch-12-inch diameter carbon fiber propellers. Likewise, some or all of the propulsion mechanisms may include a SLMR apparatus, in accordance with the disclosed implementations.

The form and/or size of some of the propellers may be different than other propellers. Likewise, the motors 501 may be any form of motor, such as a DC brushless motor, and may be of a size sufficient to rotate the corresponding propeller. Likewise, in some implementations, the size and/or type of some of the motors 501 may be different than other motors 501. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 501 and corresponding propellers 504, and optionally the SLMR apparatus, will be referred to herein collectively as a propulsion mechanism 502, such as propulsion mechanisms 502-1, 502-2, 502-3, 502-4, 502-5, and 502-6.

The aerial vehicle 500 also includes a ring wing 507 having a substantially cylindrical or circular shape that extends around and forms the perimeter of the aerial vehicle 500. In the illustrated example, the ring wing is substantially circular in shape and tapers toward the bottom of the aerial vehicle. The ring wing 507 has an airfoil shape to produce lift when the aerial vehicle is oriented as illustrated in FIG. 5 and moving in a direction that is substantially horizontal. As illustrated, the ring wing is positioned at an angle with respect to the fuselage 510 such that the lower part of the ring wing acts as a front wing as it is positioned toward the front of the aerial vehicle when oriented as shown and moving in a horizontal direction. The top of the ring wing, which has a longer chord length than the bottom portion of the ring wing 507, is positioned farther back and thus acts as a rear wing.

The ring wing is secured to the fuselage 510 by motor arms 505. In the illustrated example, each of motors arms 505-1, 505-3, 505-4, and 505-6 are coupled to the fuselage 510 at one end, extend from the fuselage 510 and couple to the ring wing 507 at a second end, thereby securing the ring wing 507 to the fuselage 510.

The fuselage 510, motor arms 505, and ring wing 507 of the aerial vehicle 500 may be formed of any one or more suitable materials, such as graphite, carbon fiber, and/or aluminum.

Each of the propulsion mechanisms 502 are coupled to a respective motor arm 505 (or propulsion mechanism arm) such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, propulsion mechanisms 502-1, 502-3, 502-4, and 502-6 are coupled at an approximate mid-point of the respective motor arm 505 between the fuselage 510 and the ring wing 507. In other implementations, the propulsion mechanisms (such as propulsion mechanisms 502-2 and 502-5 illustrated in FIG. 5) may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces, and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

The angle of orientation of each of the propulsion mechanisms 502-1, 502-3, 502-4, and 502-6 may vary for different implementations. Likewise, in some implementations, the offset of the propulsion mechanisms 502-1, 502-3, 502-4, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion mechanism 502-5. As illustrated, propulsion mechanisms 502-2 and 502-5, which are on opposing sides of the fuselage 110, are aligned and oriented in a same first direction (in this example, horizontal). Propulsion mechanisms 502-3 and 502-6, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example implementations described herein with respect to FIGS. 1-4 may also be combined and/or incorporated into the aerial vehicle 500 as illustrated in FIG. 5.

While the examples discussed above in FIGS. 1-5 describe a ring wing in either a substantially hexagonal shape (FIGS. 1-4) or a substantially circular shape (FIG. 5), in other implementations, the ring wing may have other shapes. For example, the ring wing may be substantially square, rectangular, pentagonal, octagonal, etc. Further, while the examples discussed above include six propulsion mechanism arms, six propulsion mechanisms, and six propellers, in other example implementations, the SLMR apparatus described herein may be implemented on various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations.

Figure 6:
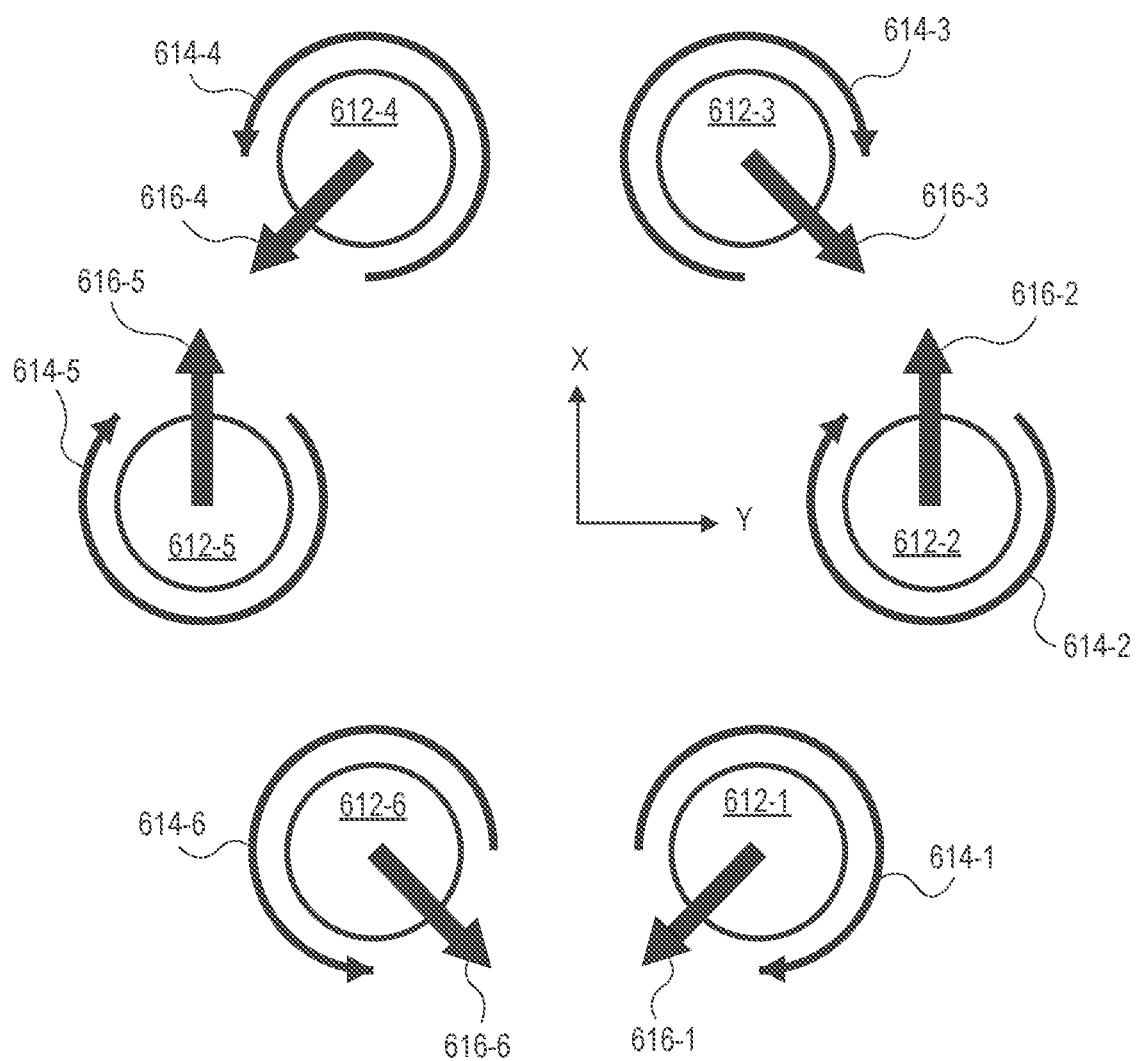
FIG. 6 illustrates forces and torques generated by propellers of a canted-hex aerial vehicle from an x-y coordinate perspective, in accordance with disclosed implementations.

FIG. 6 illustrates forces 616 and torques 614 generated by propulsion mechanisms 612 of a canted-hex aerial vehicle in which the propulsion mechanisms have different cant angles, such as those discussed above with respect to FIGS. 1-5, in accordance with disclosed implementations.

As discussed above, the propulsion mechanisms may be angled or canted toward one another in pairs so that the lateral forces and torques generated by the propulsion mechanisms of the pair cancel each other out when producing similar forces. By canting the propulsion mechanisms 612, horizontal forces 616 are generated by the thrust produced from the propulsion mechanisms 612 when the propulsion mechanisms are operating in a positive direction. The presence of horizontal forces significantly increases the Z-torque capability of each propulsion mechanism 612.

In the example illustrated with respect to FIG. 6, propulsion mechanism 612-3 is canted toward propulsion mechanism 612-2 and propulsion mechanism 612-2 is canted toward propulsion mechanism 612-3, thereby forming a pair of propulsion mechanisms in which the lateral forces 616-3, 616-2 produced by the pair of propulsion mechanisms 612-3, 612-2 substantially cancel each other out when similar forces are generated by the pair of propulsion mechanisms, leaving a thrust force in the z direction. Likewise, in examples in which the propulsion mechanisms generate a torque, such as torques 614-3, 614-2, the pair may be arranged so that the rotational torques of the pair of propulsion mechanisms cancel each other out when similar forces are generated.

Each propulsion mechanism may be paired with another propulsion mechanism. Continuing with FIG. 6, propulsion mechanism 612-1 is canted toward propulsion mechanism 612-6 and propulsion mechanism 612-6 is canted toward propulsion mechanism 612-1, thereby forming a second pair of propulsion mechanisms in which the lateral forces 616-1, 616-6 produced by the pair of propulsion mechanisms 612-1, 612-6 substantially cancel each other out when similar forces are generated by the pair of propulsion mechanisms, leaving a lifting force in the z direction. Likewise, in examples in which the propulsion mechanisms generate a torque, such as torques 614-1, 614-6, the pair may be arranged so that the rotational torques of the pair of propulsion mechanisms cancel each other out when similar forces are generated. Finally, in this example, propulsion mechanism 612-5 is canted toward propulsion mechanism 612-4 and propulsion mechanism 612-4 is canted toward propulsion mechanism 612-5, thereby forming a third pair of propulsion mechanisms in which the lateral forces 616-5, 616-4 produced by the pair of propulsion mechanisms 612-5, 612-4 substantially cancel each other out when similar forces are generated by the pair of propulsion mechanisms, leaving a lifting force in the z direction. Likewise, in examples in which the propulsion mechanisms generate a torque, such as torques 614-5, 614-4, the pair may be arranged so that the rotational torques of the pair of propulsion mechanisms cancel each other out when similar forces are generated.

In the example illustrated in FIG. 6, each of the propulsion mechanisms 612-1 through 612-6 are operating in a positive direction.

During operation of example aerial vehicles, such as those illustrated and described with respect to FIGS. 1-5, various types of faults or failure modes may arise that result in degraded operational states of the aerial vehicles. For example, one or more of the propulsion mechanisms of a hexa-rotor UAV, such as those illustrated in FIGS. 1-5, also referred to herein as a canted-hex aerial vehicle, may no longer operate normally due to various types of faults, which may be referred to as motor-out situations. In order to improve the reliability, safety, and operational capability of the aerial vehicles, the aerial vehicles may alter the direction of the opposing propulsion mechanism from positive to negative, or from negative to positive, as necessary, to maintain flight of the aerial vehicles and land at safe landing locations, in accordance with disclosed implementations. Alternatively, in some implementations, independent of a motor out event, the direction of any of the propulsion mechanisms may be changed from positive to negative, or negative to positive, to increase the agility and/or maneuverability of the aerial vehicle.

The various types of faults that may result in motor-out situations may include damage or loss of function of one or more propellers or propeller blades, damage or loss of function of one or more motors, damage or loss of function of one or more motor controllers that are each in communication with a corresponding motor and propeller, damage or loss of function between one or more motor controllers and a flight controller that is in communication with each of the motor controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor RPM and applied current with expected values of motor RPM and applied current, since a motor rotating with damaged or missing propellers or blades may draw different values of current than expected values while rotating at a particular motor RPM. In addition, damage or loss of function of one or more motors may be detected by comparison of measured RPM versus commanded RPM, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example implementations, various other types of sensors may be used to detect one or more of the various types of faults that result in motor-out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor-out situations. Various other types of sensors may also detect aspects of flight, navigation, movement, or operation of various components of the aerial vehicles to identify one or more faults. Moreover, the various types of faults may be detected by various combinations of methods described herein.

In situations when a hex-rotor vehicle, in which all the propulsion mechanisms are oriented in the same direction, referred to herein as a flat-hex, experiences a motor-out event, it may disable an opposing motor to the one that experienced the motor-out and be left with four active propulsion mechanisms and operate somewhat similar to that of a typical quad-rotor, although it may not have all four degrees of freedom and each adjacent propeller may not be rotating in opposing directions. However, unlike a quad-rotor, a canted-hex aerial vehicle, such as those illustrated and discussed above with respect to FIGS. 1-5, has independent control over all three force degrees of freedom (X-force, Y-force, Z-force) and all three torque degrees of freedom (X-torque, Y-torque, Z-torque). When a canted-hex aerial vehicle experiences a motor-out of one of the motors, leaving only five operational propulsion mechanisms, the degraded canted-hex aerial vehicle loses the six degrees of freedom and is only able to substantially turn in a single direction, such as right, when all of the propulsion mechanisms are operating in a positive direction. To resolve this limitation, the disclosed implementations aid in reversing the direction of an opposing propulsion mechanism to the propulsion mechanism that experienced the motor-out event. When the opposing propulsion mechanism reverses direction, e.g. from positive to negative, the degraded canted-hex aerial vehicle is able to turn in the opposite direction. For example, if the degraded canted-hex aerial vehicle is only able to substantially turn right during a motor out event when all propulsion mechanisms are operating in a positive direction, by altering the direction of the opposing propulsion mechanism from positive to negative, the aerial vehicle is able to turn left, but may lose the ability to turn substantially right while that motor is operating in the opposite direction. By reversing the direction of the propulsion mechanism from positive to negative, or negative to positive, as necessary, control of the degraded canted-hex aerial vehicle is maintained.

Figure 7:
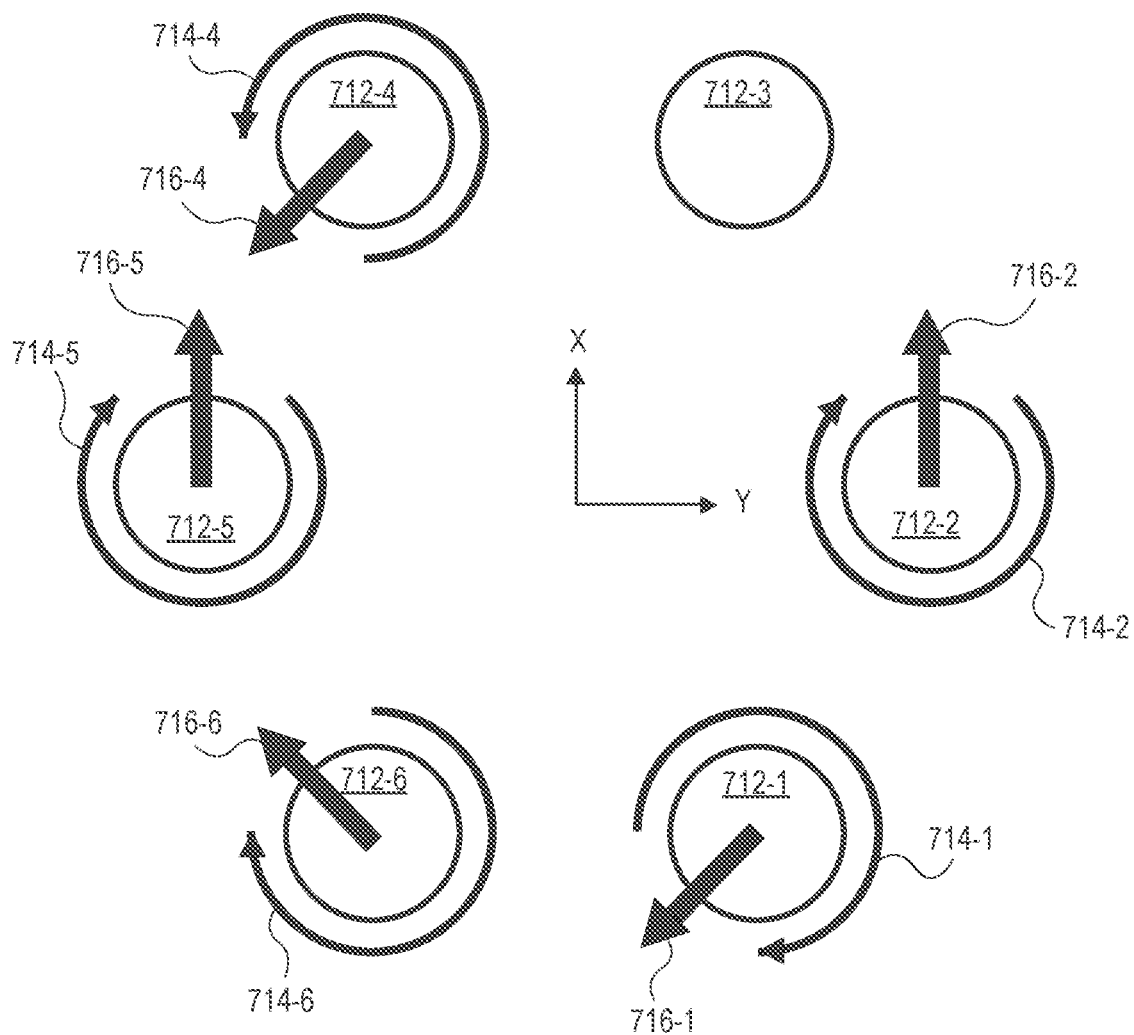
FIG. 7 illustrates various forces and torques generated by propellers of a canted-hex aerial vehicle when one of the motors is not in operation and an opposing motor is operating in a reverse direction, in accordance with disclosed implementations.

Referring first to FIG. 7, if a motor-out occurs for propulsion mechanism 712-3, such that no forces are produced by propulsion mechanism 712-3, the disclosed implementations aid in the reversal of the direction of the opposing propulsion mechanism, in this example 712-6, from a positive direction, as illustrated in FIG. 6, to a negative direction, as illustrated in FIG. 7. As illustrated, when the direction of the propulsion mechanism 712-6 is reversed to a negative direction, the thrust changes from a positive direction, as illustrated in FIG. 6 as thrust 616-6, to a negative direction, as illustrated in FIG. 7 as thrust 716-6. The torque 714-6 also changes direction when the rotational direction of the propulsion mechanism changes from a positive direction, as illustrated in FIG. 6 as 614-6, to a negative direction, as illustrated in FIG. 7 as 714-6, or from negative to positive. In the example illustrated in FIG. 7, the other forces 716-1, 716-2, 716-4, 716-5 and torques 714-1, 714-2, 714-4, 714-5 produced by the other propulsion mechanisms 712-1, 712-2, 712-4, 712-5 remain in the positive direction. As discussed further below, the implementations described herein aid the reversal of a propulsion mechanism from positive to negative, or negative to positive.

While the above example discussed with respect to FIGS. 6 through 7 relate to reverse the direction of a propulsion mechanism in response to a motor-out event, the disclosed implementations are equally applicable to propulsion mechanism reversal of any propulsion mechanism at any time. For example, the disclosed implementations may be used to aid in the reversal of one or more propulsion mechanisms of an aerial vehicle, such as one of the aerial vehicles discussed above with respect to FIGS. 1-5, from a positive direction to a negative direction, or from a negative direction to a positive direction, to increase the agility and/or maneuverability of the aerial vehicle.

Figure 8:
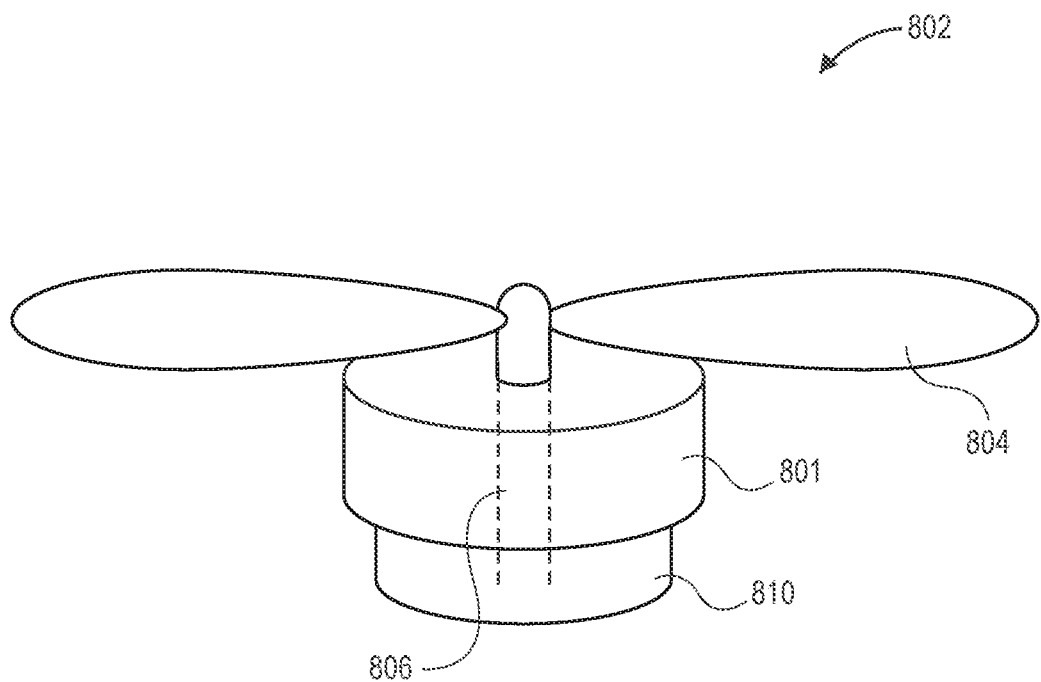
FIG. 8 is a diagram of an example brushless direct current motor and attached sensor-less motor reversal apparatus, in accordance with disclosed implementations.

FIG. 8 is a diagram of a propulsion mechanisms 802 that includes a brushless direct current ("BLDC") motor 801 and attached SLMR apparatus 810, in accordance with disclosed implementations. In other implementations, the SLMR apparatus 810 may be used with other types of bidirectional motors.

As is known, BLDC motors 801 are used ubiquitously in the UAV industry due to their mechanical simplicity and reliability. In the vast majority of applications, the motor 801 spins the drive shaft 806 in a fixed direction during flight, referred to herein as a positive direction, that causes the attached propeller 804 to generate thrust and torque in a single direction. As discussed above, having bidirectional thrust capabilities of one or more propulsion mechanisms 802 of an aerial vehicle can be advantageous for a number of reasons, including improved maneuverability and robustness to propulsion mechanism failures (e.g., motor-out events). The two most common techniques for reversing the thrust direction of a propulsion mechanism is through the use of variable pitch propellers that reverse the thrust direction by altering the pitch of the propeller itself and motors that have the ability to reverse the rotational direction of the drive shaft 806 of the motor, and thus the directional rotation of the attached propeller 804.

Reversal control of a motor can be entirely embedded in the ESC and performed with a standard BLDC motor 801 and propeller 804. Specifically, as is known, a BLDC motor 801 has three independent copper windings, or phases. The ESC of the aerial vehicle is used to drive current through those three phases and energizes them in a specific sequence to generate spinning motion. At any instance in time, only two of the three phases are energized, and the third is unenergized. In addition, typical BLDC motors 801 rely in RPM feedback to improve the performance and robustness of their response to RPM commands. For example, the RPM of a motor 801 may be measured indirectly through the measurement of back-Electromotive force ("back-EMF") current induced by the spinning of the motor's 801 phases through the magnetic field of the motor's 801 permanent magnets. The back-EMF current is measured using the third, inactive, phase of the BLDC.

While indirectly measuring the RPM through the back-EMF of the motor 801 provides a sensor-less method that works well during high RPMs of the motor 801, the performance and reliability of such measurements degrade at lower RPMs because the back-EMF channel becomes weak which results in low signal-to-noise ratio. This inability to accurately measure RPM through the back-EMF of the motor during low RPM results in poor RPM tracking performance during a motor reversal as the motor transitions from positive RPMs to negative RPMs, or from negative RPMs to positive RPMs. As a result, long dwell times around zero RPM, and thus slow thrust reversal of the motor 801, may result due to the inability to accurately measure the RPM through the back-EMF channel when the motor is rotating slowly. In extreme cases, during motor reversal, the motor may cease rotation, jitter, or even rotate in the wrong direction. This degraded performance during transition due to the inability to accurately measure low RPMs when the motor is transitioning from positive to negative, or negative to positive, adversely affects the performance of the aerial vehicle.

Rather than add an additional sensor, such as a Hall sensor or encoder, to aid in the measurement of RPMs, the disclosed implementations provide a technical solution to resolve the degraded performance problem and aid in the transition from positive to negative rotation, or negative to positive rotation, without the addition of any sensors. Specifically, the disclosed implementations aid the transition of motor rotation from positive to negative, or negative to positive, through the use of an apparatus, referred to herein as a SLMR apparatus 810, that is attached to the motor 801 that provides energy to the motor during the low RPM transition to aid in passing the motor rotation through that transition and back to higher RPMs in the opposite direction so that the RPMs can be reliably measured through the back-EMF channel of the motor 801.

In some implementations, as illustrated in FIG. 8, the SLMR apparatus 810 may be affixed to a non-rotating portion of the motor 801 and the drive shaft 806 of the motor may be designed to partially extend through the motor 801 and into the SLMR apparatus 810 to allow engagement by the SLMR apparatus 810. In other implementations, the SLMR apparatus 810 may be incorporated into the motor 801 or otherwise included in the propulsion mechanism to enable aided transition of the motor 801 through the low RPM ranges of motor reversal, in accordance with the disclosed implementations.

As discussed further below, implementations of the SLMR apparatus as described herein may include one or more of an RPM dependent clutch, an engageable shaft, an energy storage mechanism, a latch, and a latch release mechanism that work together to store and/or release potential energy to aid in a transition of a rotation of the drive shaft of the motor to which the SLMR apparatus is attached through a low RPM range and from either a positive direction to a negative direction, or from a negative direction to a positive direction. As discussed further below, the low RPM range, as used herein, is a range of RPMs of the motor for which measurement of the RPM of the motor using the back-EMF of the motor is unreliable.

Implementations of the disclosed the SLMR apparatus described herein may include one or more of an engageable shaft that is coaligned with a drive shaft of a brushless DC motor of an unmanned aerial vehicle ("UAV"), wherein the brushless DC motor is operable to rotate the drive shaft in either a positive direction or a negative direction, an RPM dependent clutch that is coupled to and rotates with the drive shaft of the brushless DC motor and is operable to engage or disengage the engageable shaft, wherein the RPM dependent clutch engages and rotates the engageable shaft during a low RPM range between a negative RPM of the drive shaft and a positive RPM of the drive shaft and disengages the engageable shaft during a high RPM of the drive shaft that is not between the negative RPM and the positive RPM, an energy storage mechanism that is rotated by the engageable shaft from a first position to a second position when the engageable shaft is rotated in the positive direction as a result of a first engagement by the RPM dependent clutch as the RPM of the drive shaft increases from a zero RPM toward the positive RPM, wherein the energy storage mechanism stores a first energy when the energy storage mechanism is in the second position, a first latch, wherein the first latch engages and holds the energy storage mechanism in the second position while the RPM of the drive shaft is in the high RPM, the drive shaft is rotating in the positive direction, and the engageable shaft is disengaged by the RPM dependent clutch, and a latch release mechanism that is rotated by the engageable shaft from a third position to a fourth position when the engageable shaft is rotated in the positive direction as a result of a second engagement by the RPM dependent clutch as the RPM of the drive shaft decreases from the high RPM and into the low RPM range as the drive shaft is rotating in the positive direction, wherein the latch release mechanism contacts the first latch as the latch release mechanism rotates from the third position to the fourth position causing the first latch to disengage the energy storage mechanism.

Optionally, subsequent to the energy storage mechanism being disengaged by the first latch and while the RPM of the drive shaft is in the low RPM range, the energy storage mechanism rotates from the second position to the first position discharging the first energy stored by the energy storage mechanism, wherein the first energy discharged by the energy storage mechanism aids in a first transition of a rotation of the drive shaft from the positive direction to the negative direction. Optionally, the energy storage mechanism, subsequent to the discharge of the first energy stored by the energy storage mechanism, is rotated by the engageable shaft from the first position to a fifth position when the engageable shaft is rotated in the negative direction as a result of the second engagement by the RPM dependent clutch as the RPM of the drive shaft increases from zero RPM toward the negative RPM, wherein the energy storage mechanism stores a second energy when in the fifth position. Optionally, the SLMR apparatus comprises one or more of a second latch, wherein the second latch engages and holds the energy storage mechanism in the fifth position while the RPM of the drive shaft is in the high RPM, the drive shaft is rotating in the negative direction, and the engageable shaft is disengaged by the RPM dependent clutch. Optionally, the latch release mechanism of the SLMR apparatus is rotated by the engageable shaft from the third position to a sixth position when the engageable shaft is rotated as a result of a third engagement by the RPM dependent clutch as the RPM of the drive shaft decreases from the high RPM and into the low RPM range as the drive shaft rotates in the negative direction, wherein the latch release mechanism contacts the second latch as the latch release mechanism rotates from the third position to the sixth position causing the second latch to disengage the energy storage mechanism. Optionally, subsequent to the second latch disengaging the energy storage mechanism and while the RPM of the drive shaft is in the low RPM range, the energy storage mechanism rotates from the sixth position to the first position discharging the second energy stored by the energy storage mechanism, wherein the second energy discharged by the energy storage mechanism aids in a second transition of the rotation of the drive shaft from the negative direction to the positive direction.

Implementations of the disclosed the SLMR apparatus described herein may include one or more of an engageable shaft that is coaligned with a drive shaft of a motor, wherein the motor is operable to rotate the drive shaft in either a positive direction or a negative direction, an RPM dependent clutch that is coupled to and rotates with the drive shaft of the motor and is operable to engage or disengage the engageable shaft, wherein the RPM dependent clutch engages and rotates the engageable shaft during a low RPM range between a negative RPM of the drive shaft and a positive RPM of the drive shaft and disengages the engageable shaft during a high RPM of the drive shaft that is not between the negative RPM and the positive RPM, and an energy storage mechanism that rotates in the positive direction from a first position to a second position when the engageable shaft is rotating in the positive direction and increasing in RPM in the positive direction, wherein the energy storage mechanism stores a first energy when the energy storage mechanism is in the second position, rotates in the negative direction from the second position to aid in a first transition of a rotation of the drive shaft from the positive direction to the negative direction, rotates in the negative direction from the first position to a third position when the engageable shaft is rotating in the negative direction and increasing in RPM in the negative direction, wherein the energy storage mechanism stores a second energy when in the energy storage mechanism is in the third position, and rotates in the positive direction from the third position to aid in a second transition of the rotation of the drive shaft from the negative direction to the positive direction.

Optionally, the SLMR apparatus may include a first latch at the second position, wherein the first latch engages and holds the energy storage mechanism in the second position while the RPM of the drive shaft is in the high RPM, the drive shaft is rotating in the positive direction, and the engageable shaft is disengaged by the RPM dependent clutch, and/or a second latch at the third position, wherein the second latch engages and holds the energy storage mechanism in the third position while the RPM of the drive shaft is in the high RPM, the drive shaft is rotating in the negative direction, and the engageable shaft is disengaged by the RPM dependent clutch. Optionally, the SLMR apparatus may include a latch release mechanism that rotates in the positive direction from a fourth position to a fifth position when the engageable shaft is rotating in the positive direction, contacts the first latch as the latch release mechanism rotates from the fourth position to the fifth position and causes the first latch to rotate from a first latched position to a first open position, rotates in the negative direction from the fourth position to a sixth position when the engageable shaft is rotating in the negative direction, and contacts the second latch as the latch release mechanism rotates from the fourth position to the sixth position and causes the second latch to rotate from a second latched position to a second open position. Optionally, the latch release mechanism may further include a torque limiter that couples the latch release mechanism to the engageable shaft such that the latch release mechanism is rotated by the engageable shaft in either the positive direction or the negative direction when a torque of the torque limiter is below a threshold, and the latch release mechanism does not rotate with the engageable shaft in either the positive direction or the negative direction when the torque of the torque limiter is above the threshold. Optionally, the first latch may further include at least one pivot that allows a release plate of the first latch to pivot so that the latch release mechanism can pass the first latch as the latch release mechanism rotates from the fifth position to the fourth position, and causes the first latch to rotate from the first latched position to the first open position when the latch release mechanism contacts the release plate as the latch release mechanism rotates from the fourth position to the fifth position. Optionally, the energy storage mechanism may further include a torque limiter that couples the energy storage mechanism to the engageable shaft such that the energy storage mechanism is rotated by the engageable shaft in either the positive direction or the negative direction when a torque of the torque limiter is below a threshold, and the energy storage mechanism does not rotate with the engageable shaft in either the positive direction or the negative direction when the torque of the torque limiter is above the threshold. Optionally, the energy storage mechanism may further include an energy storage device that stores the first energy as potential energy as the energy storage mechanism rotates in the positive direction and discharges the first energy as the energy storage mechanism rotates in the negative direction. Optionally, the energy storage device may be a spring. Optionally, the RPM dependent clutch may further include one or more of a shaft clamp operable to engage or disengage the engageable shaft, and an energy storage device that stores potential energy when the RPM of the drive shaft is rotating at the high RPM and causes the shaft clamp to disengage from the engageable shaft, and discharges the potential energy when the RPM of the drive shaft is in the low RPM range and causes the shaft clamp to engage the engageable shaft.

Implementations of the disclosed SLMR apparatus described herein may include one or more of an engageable shaft, an RPM dependent clutch that is coupled to and rotates with a drive shaft of a motor and is operable to engage or disengage the engageable shaft, wherein the RPM dependent clutch engages and rotates the engageable shaft during a low RPM range between a negative RPM of the drive shaft and a positive RPM of the drive shaft and disengages the engageable shaft during a high RPM of the drive shaft that is not between the negative RPM and the positive RPM, an energy storage mechanism that is rotated by the engageable shaft from a first position to a second position as a result of a first engagement of the engageable shaft by the RPM dependent clutch as the RPM of the drive shaft increases from a zero RPM toward the positive RPM, wherein the energy storage mechanism stores a potential energy while in the second position, a latch, wherein the latch engages and holds the energy storage mechanism in the second position while the RPM of the drive shaft is in the high RPM and the engageable shaft is disengaged by the RPM dependent clutch and disengages the energy storage mechanism when the RPM of the drive shaft is decreasing from the high RPM toward the zero RPM such that the potential energy stored by the energy storage mechanism can discharge and aid in a transition of a rotation of the drive shaft from a positive direction to a negative direction.

Optionally, the SLMR apparatus may be stateless and may be initiated in either a positive direction or a negative direction. Optionally, the SLMR apparatus further includes a latch release mechanism rotated by the engageable shaft that engages the latch as the latch release mechanism rotates and causes the latch to disengage the energy storage mechanism. Optionally, the energy storage mechanism further includes a torque limiter that couples the energy storage mechanism to the engageable shaft such that the energy storage mechanism is rotated by the engageable shaft in either the positive direction or the negative direction when a torque of the torque limiter is below a threshold, and the energy storage mechanism does not rotate with the engageable shaft in either the positive direction or the negative direction when the torque of the torque limiter is above the threshold. Optionally, the energy storage mechanism further includes a gearing mechanism to adjust a rate of rotation of the energy storage mechanism with respect to the rotation of the engageable shaft. Optionally, the RPM dependent clutch further includes at least one shaft clamp operable to engage or disengage the engageable shaft in response to a centrifugal force generated by the rotation of the drive shaft, and at least one lever operable to aid in a disengagement of the shaft clamp from the engageable shaft based at least in part on the centrifugal force generated by the rotation of the drive shaft.

Implementations of the disclosed inverted centrifugal clutch apparatus may include one or more of a first clamp coupled to and rotatable about a first pivot between an engaged position and a disengaged position, a second clamp coupled to and rotatable about a second pivot between the engaged position and the disengaged position, and a first lever coupled to and rotatable about a third pivot between a first clamp contact position and a first clamp release position. When the first lever is in the first clamp contact position the first lever contacts the first clamp and maintains the first clamp in the disengaged position and when the first lever is in the first clamp release position the first lever releases the first clamp. The inverted centrifugal clutch may also include a second lever coupled to and rotatable about a fourth pivot between a second clamp contact position and a second clamp release position. When the second lever is in the second clamp contact position the second lever contacts the second clamp and maintains the second clamp in the disengaged position and when the second lever is in the second clamp release position the second lever releases the second clamp. The inverted centrifugal clutch may also include a first energy storage device coupled to the first clamp to move the first clamp into the engaged position when the first lever is in the first clamp release position, a second energy storage device coupled to the second clamp to move the second clamp into the engaged position when the second lever is in the second clamp release position, a third energy storage device coupled to the first lever that stores a first energy when the first lever is in the first clamp contact position and moves the first lever into the first clamp release position when the first energy is discharged by the third energy storage device, such that the third energy storage device stores the first energy during a high RPM of the inverted centrifugal clutch apparatus, and the third energy storage device discharges the first energy during a low RPM of the inverted centrifugal clutch apparatus. The inverted centrifugal clutch may also include a fourth energy storage device coupled to the second lever that stores a second energy when the fourth lever is in the second clamp contact position and moves the second lever into the second clamp release position when the second energy is discharged by the fourth energy storage device, such that the fourth energy storage device stores the second energy during the high RPM of the inverted centrifugal clutch apparatus and the fourth energy storage device discharges the second energy during the low RPM of the inverted centrifugal clutch apparatus.

Optionally, the inverted centrifugal clutch apparatus may also include one or more of a first mass coupled to the first lever, the first mass positioned to cause the first lever to move into the first clamp contact position in response to a centrifugal force applied to the first mass during the high RPM of the inverted centrifugal clutch apparatus and/or a second mass coupled to the second lever, the second mass positioned to cause the second lever to move into the second clamp contact position in response to the centrifugal force applied to the first mass during the high RPM of the inverted centrifugal clutch apparatus. Optionally, at least one of the first energy storage device, the second energy storage device, the third energy storage device or the fourth energy storage device may include at least one of a spring, a piston, or a magnet. Optionally, the first clamp and the second clamp may be positioned to engage and rotate a shaft when the first clamp and the second clamp are in the engaged position.

Implementations of the disclosed inverted centrifugal clutch apparatus may include one or more of a first clamp coupled to and rotatable about a first pivot between an engaged position and a disengaged position, wherein the first clamp is in the engaged position during a low RPM range of the apparatus and in the disengaged position during a high RPM range of the apparatus, and a first lever coupled to and rotatable about a third pivot between a first clamp contact position and a first clamp release position. When the first lever is in the first clamp contact position the first lever contacts the first clamp and maintains the first clamp in the disengaged position and when the first lever is in the first clamp release position the first lever releases the first clamp. The inverted centrifugal clutch apparatus may also include one or more of a first energy storage device coupled to the first clamp to move the first clamp into the engaged position when the first lever is in the first clamp release position and disengaged from the first clamp and a second energy storage device coupled to the first lever and operable to store a first energy and move the first lever into the first clamp contact position when the inverted centrifugal clutch apparatus is in the high RPM range and discharge the first energy and move the first lever into the first clamp release position when the inverted centrifugal clutch apparatus is in the low RPM range.

Optionally, the inverted centrifugal clutch apparatus may include one or more of a second clamp coupled to and rotatable about a second pivot between the engaged position and the disengaged position, wherein the second clamp is opposite the first clamp and/or a second lever coupled to and rotatable about a fourth pivot between a second clamp contact position and a second clamp release position. When the second lever is in the second clamp contact position the second lever engages the second clamp and maintains the second clamp in the disengaged position and when the second lever is in the second clamp release position the second lever disengages the second clamp. Optionally, the inverted centrifugal clutch apparatus may also include one or more of a third energy storage device coupled to the second clamp to move the second clamp into the engaged position when the second lever is in the second clamp release position and disengaged from the second clamp and a fourth energy storage device coupled to the second lever that stores a second energy when the second lever is in the second clamp contact position, the second lever is in the second clamp contact position when the inverted centrifugal clutch apparatus is in the high RPM range and the fourth energy storage device discharges the second energy and moves the second lever into the second clamp release position when the inverted centrifugal clutch apparatus is in the low RPM range. Optionally, the inverted centrifugal clutch apparatus may be coupled to and rotate with a drive shaft. Optionally, the inverted centrifugal clutch apparatus may further include a first mass coupled to the first lever, the first mass positioned to cause the first lever to move into the first clamp contact position in response to a centrifugal force applied to the first mass during the high RPM range of the inverted centrifugal clutch apparatus. Optionally, the first energy storage device may store a second energy when the first clamp is in the disengaged position and the first energy storage device may discharge the second energy and cause the first clamp to move to the engaged position when the first lever moves to the first clamp disengaged position. Optionally, the second energy stored by the first energy storage device may be greater than the first energy stored by the second energy storage device. Optionally, at least one of the first energy storage device or the second energy storage device may include at least one of a spring, a piston, or a magnet. Optionally, the first energy stored by the first lever is different than a second energy stored by a second energy storage device coupled to the first clamp. Optionally, the first clamp may be operable to engage and rotate a shaft when the first clamp is in the engaged position.

Implementations of the disclosed inverted centrifugal clutch apparatus may include one or more of a first energy storage device operable to store a first energy when the inverted centrifugal clutch apparatus is operating at a high RPM and discharge the first energy when the inverted centrifugal clutch apparatus is not operating at the high RPM, a first clamp coupled to the first energy storage device and operable to be moved by the first energy storage device between a disengaged position when the inverted centrifugal clutch apparatus is operating at the high RPM and an engaged position when the inverted centrifugal clutch apparatus is not operating at the high RPM, and a first lever operable to hold the first clamp in the disengaged position when the inverted centrifugal clutch apparatus is operating at the high RPM and to release the first clamp when the inverted centrifugal clutch apparatus is not operating at the high RPM.

Optionally, the inverted centrifugal clutch apparatus may further include a second energy storage device coupled to the first lever and operable to at least store a second energy when the inverted centrifugal clutch apparatus is operating at the high RPM such that the first lever holds the first clamp in the disengaged position, and discharge the second energy when the inverted centrifugal clutch apparatus is not operating at the high RPM such that the first lever releases the first clamp. Optionally, the inverted centrifugal clutch apparatus may further include a mass coupled to the first lever and positioned such that a centrifugal force acting on the mass causes the first lever to hold the first clamp in the disengaged position when the inverted centrifugal clutch apparatus is operating at the high RPM. Optionally, the inverted centrifugal clutch apparatus may further include one or more of a second energy storage device operable to store a second energy when the inverted centrifugal clutch apparatus is operating at the high RPM and discharge the second energy when the inverted centrifugal clutch apparatus is not operating at the high RPM, and a second clamp coupled to the second energy storage device and operable to be moved by the second energy storage device between the disengaged position when the inverted centrifugal clutch apparatus is operating at the high RPM and the engaged position when the inverted centrifugal clutch apparatus is not operating at the high RPM. Optionally, the inverted centrifugal clutch apparatus may further include a second lever operable to hold the second clamp in the disengaged position when the inverted centrifugal clutch apparatus is operating at the high RPM and to release the second clamp when the inverted centrifugal clutch apparatus is not operating at the high RPM. Optionally, the inverted centrifugal clutch apparatus may further include a third energy storage device coupled to the second lever and operable to at least store a third energy when the inverted centrifugal clutch apparatus is operating at the high RPM such that the second lever holds the second clamp in the disengaged position, and discharge the third energy when the inverted centrifugal clutch apparatus is not operating at the high RPM such that the second lever releases the second clamp.

Figure 9:
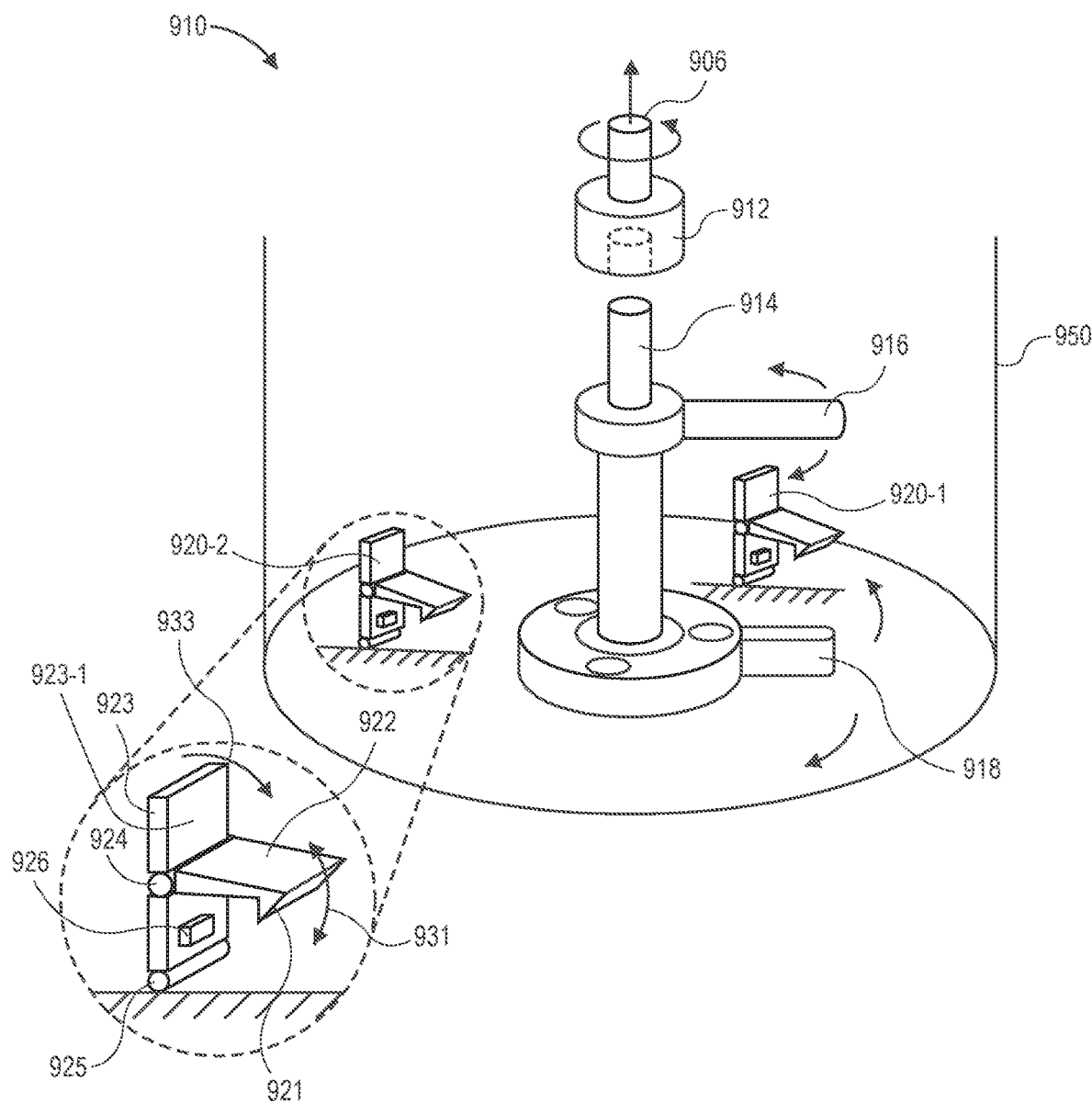
FIG. 9 is a diagram of components of the sensor-less motor reversal apparatus, in accordance with disclosed implementations.

FIG. 9 is an expanded diagram of components of the sensor-less motor reversal apparatus 910, in accordance with disclosed implementations. The SLMR apparatus 910 corresponds to the SLMR apparatus 810 of FIG. 8.

As illustrated, the SLMR apparatus 910 includes an RPM dependent clutch 912, also referred to herein as an inverted centrifugal clutch, that is affixed to and rotates with the drive shaft 906 of the motor, such as the motor 801 illustrated in FIG. 8. The SLMR apparatus 910 also includes an engageable shaft 914 that is coaxially aligned with the drive shaft 906 and inserted into the RPM dependent clutch 912 during operation and is selectively engageable by the RPM dependent clutch 912, as discussed further below with respect to FIGS. 10A through 10B. Also included in the SLMR apparatus 910 is a latch release mechanism 916, energy storage mechanism 918 and two one-way latches 920-1/920-2.

During operation, as discussed further below, the RPM dependent clutch 912 that is attached to and rotates with the drive shaft 906, engages and rotates engageable shaft 914 during a low RPM range of the drive shaft 906 and disengages the engageable shaft 914 during high RPMs of the drive shaft 906 that are not within the low RPM range, regardless of rotational direction of the drive shaft 906.

The engageable shaft 914, when engaged and rotated by the RPM dependent clutch 912, rotates in the same direction as the drive shaft 906. The rotation of the engageable shaft 914 causes the latch release mechanism 916, which may be coupled to the engageable shaft though a torque limiter, to rotate in the same direction as the engageable shaft 914 past one of the latches 920-1/920-1. After passing the latch 920 and as the torque on the torque limiter increases, the latch release mechanism 916 stops rotating with the engageable shaft 914, as discussed further below with respect to FIG. 12.

Likewise, when the engageable shaft 914 is engaged and rotated, it causes rotation of the energy storage mechanism 918, which may also be attached to the engageable shaft through a second torque limiter, such that the energy storage mechanism 918 rotates in the direction of the rotation of the engageable shaft 914 and into one of the one-way latches 920-1/920-2 at a point in time after the latch release mechanism has already passed the one-way latch 920-1/920-2 such that the energy storage mechanism is engaged and retained by the one-way latch 920-1/920-2. As with the latch release mechanism, as the torque on the second torque limiter increases, the energy storage mechanism 918 stops rotating with the engageable shaft 914 and is retained by the one-way latch 920-1.

As the RPMs of the drive shaft 906 increase, the RPM dependent clutch 912 disengages the engageable shaft 914, as discussed further below with respect to FIGS. 10A through 10B. Upon disengagement of the engageable shaft 914, the engageable shaft stops rotating and the latch release mechanism 916 returns to a neutral position, passing back by the one-way latch 920-1/920-2 without disengaging the energy storage mechanism 918 that is held by the one-way latch 920-1/920-2.

Referring to the expanded view of one of the one-way latches 920-1/920-2, the one way latch may include a retaining arm 922 with a catch 921 that is configured to allow the arm of the energy storage mechanism to pass by the catch as it enters the one-way latch but be held by the catch 921 of the one-way latch 920 until released. The one-way latch 920-1/920-2 may also include a plate pivot 924 that allows the release plate 923 to rotate in the direction of the arrow 933 but does not allow the release plate 923 to rotate in the opposite direction. Likewise, the base pivot 925 allows the one-way latch 920 to rotate in the direction of the arrows 931 between a latched position and an open position. For example, when the face 923-1 is engaged by the latch release mechanism 916, as discussed further below, the base pivot 925 allows the release mechanism to rotate from the engaged position to the open position so that if the energy storage mechanism 918 is held by the one-way latch 920, the energy storage mechanism is disengaged. The one-way latch may also include an ejection device 926 that aids in an ejection or dislodgement of the energy storage mechanism when released by the one-way latch, as discussed above, so that the energy storage mechanism is able to discharge as the RPM of the motor slows and is not re-latched by the one-way latch before the energy is discharged. The ejection device 926 may include a spring, a lever, etc., that pushes the energy storage mechanism out of the latch when the one-way latch is contacted and rotated by the latch release mechanism 916, etc. Alternatively, or in addition thereto, the latch release mechanism 916 may include a fixed pivot that causes a portion of the one-way latch to rotate inward and eject or dislodge the energy storage mechanism when the latch is rotated from the engaged position to the open position.

While the example discussed with respect to FIG. 9 describes two pivots, in other implementations, fewer or additional pivots may be used. Likewise, in other implementations, other forms of latches, such as electromechanical, magnetic, etc., may be used to engaged/disengage the energy storage mechanism. In addition, while the above example describes the use of an ejection device 926, in other implementations, the one-way latch 920 may be configured such that the one-way latch 920, with or without an ejection device 926, will latch and hold the energy storage mechanism 918 when the energy storage mechanism 918 rotates into and contacts the one-way latch 920 with a force that is above a defined threshold, but will not re-latch if the energy storage mechanism 918 is already in contact with the one-way latch 920. For example, and referring to the above discussion, when the drive shaft 906 is increasing in speed, the RPM dependent clutch 906 is engaged with and rotating the engageable shaft 914, and the energy storage mechanism 918 rotates into and contacts the one-way latch 920 with a force above the defined threshold, the one-way latch 920 latches and holds the energy storage mechanism 918. At a subsequent time, when the motor is decreasing in speed and the RPM dependent clutch 912 re-engages the engageable shaft 914, the latch release mechanism 916 rotates into and contacts the one-way latch 920 moving the one-way latch 920 to the open position, the one-way latch will not re-latch the energy storage mechanism 918 because the energy storage mechanism 918 is already in contact with the one-way latch 920 and is not rotating into/impacting the one-way latch 920 with a force above the defined threshold.

FIG. 9 illustrates the SLMR apparatus 910 in an expanded view to simplify discussion of the different mechanisms of the SLMR apparatus 910. In operation, the SLMR 910 may be much more compact, as illustrated in FIG. 8, and the RPM dependent clutch 912 and mechanisms 916, 918 stacked on the engageable shaft 914 are contained within a housing 950 of the SLMR apparatus 910. Likewise, as illustrated, the one-way latches 920-1/920-2 may be affixed to the housing 950 such that they do not rotate with rotation of the drive shaft 906 and/or rotation of the engageable shaft 914.

Figure 10A:
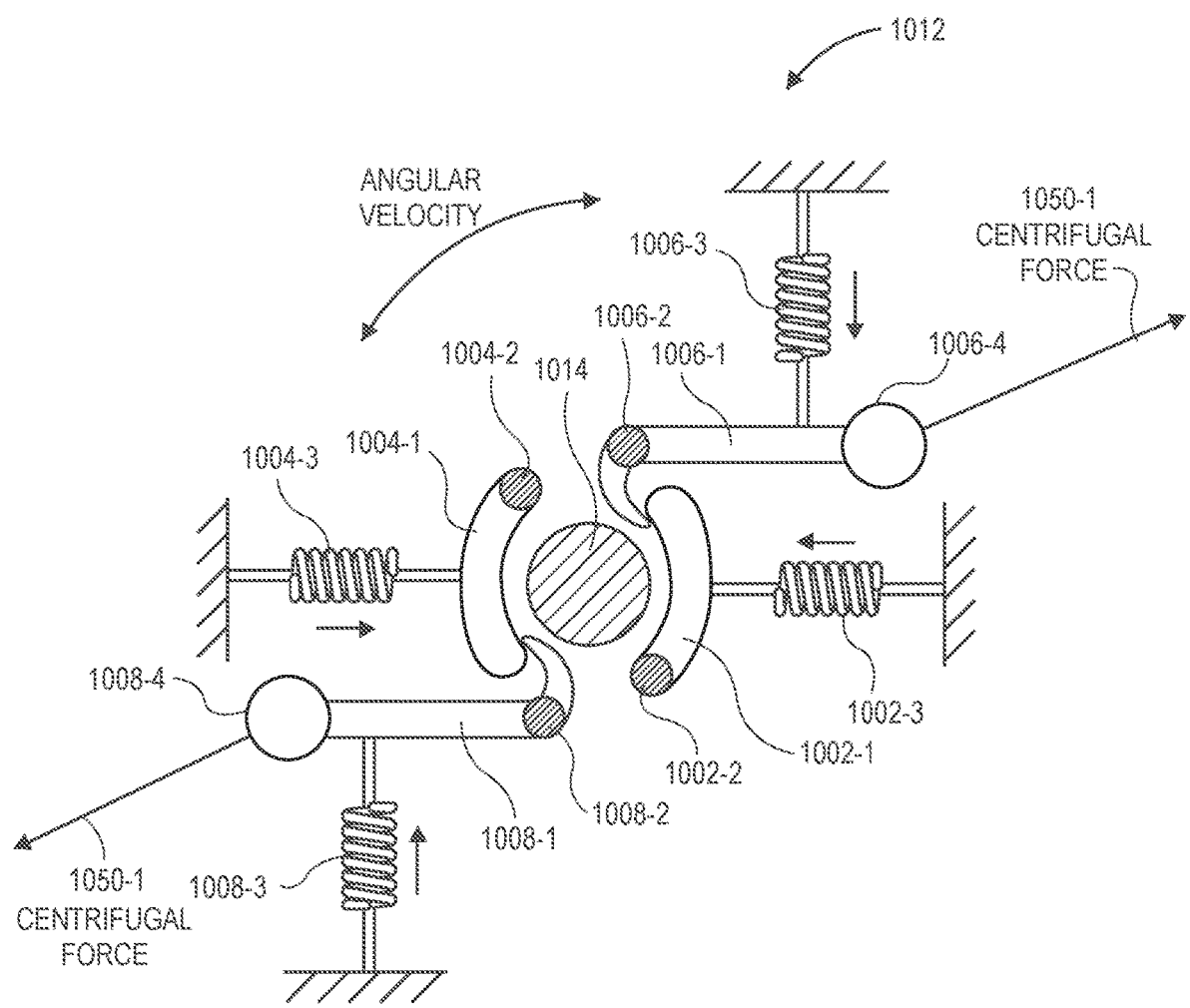
FIG. 10A is a diagram of an RPM dependent clutch in a disengaged position that occurs during high revolutions per minute of the drive shaft of the motor, in accordance with disclosed implementations.

FIG. 10A is a diagram of an RPM dependent clutch 1012 apparatus of the sensor-less motor reversal apparatus illustrated in FIGS. 8 and 9 in a disengaged position that occurs during high RPMs of the drive shaft, in accordance with disclosed implementations. In the particular example illustrated in FIGS. 10A and 10B, the RPM dependent clutch is a mechanically driven inverted centrifugal clutch that causes engagement at low RPM of the drive shaft to which the inverted centrifugal clutch is coupled, and disengagement at higher RPM. While the example discussed with respect to FIGS. 10A through 10B describe the RPM dependent clutch as an inverted centrifugal clutch, in other implementations, the RPM dependent clutch may be electromagnetically controlled, electrically controlled, etc.

Figure 10B:
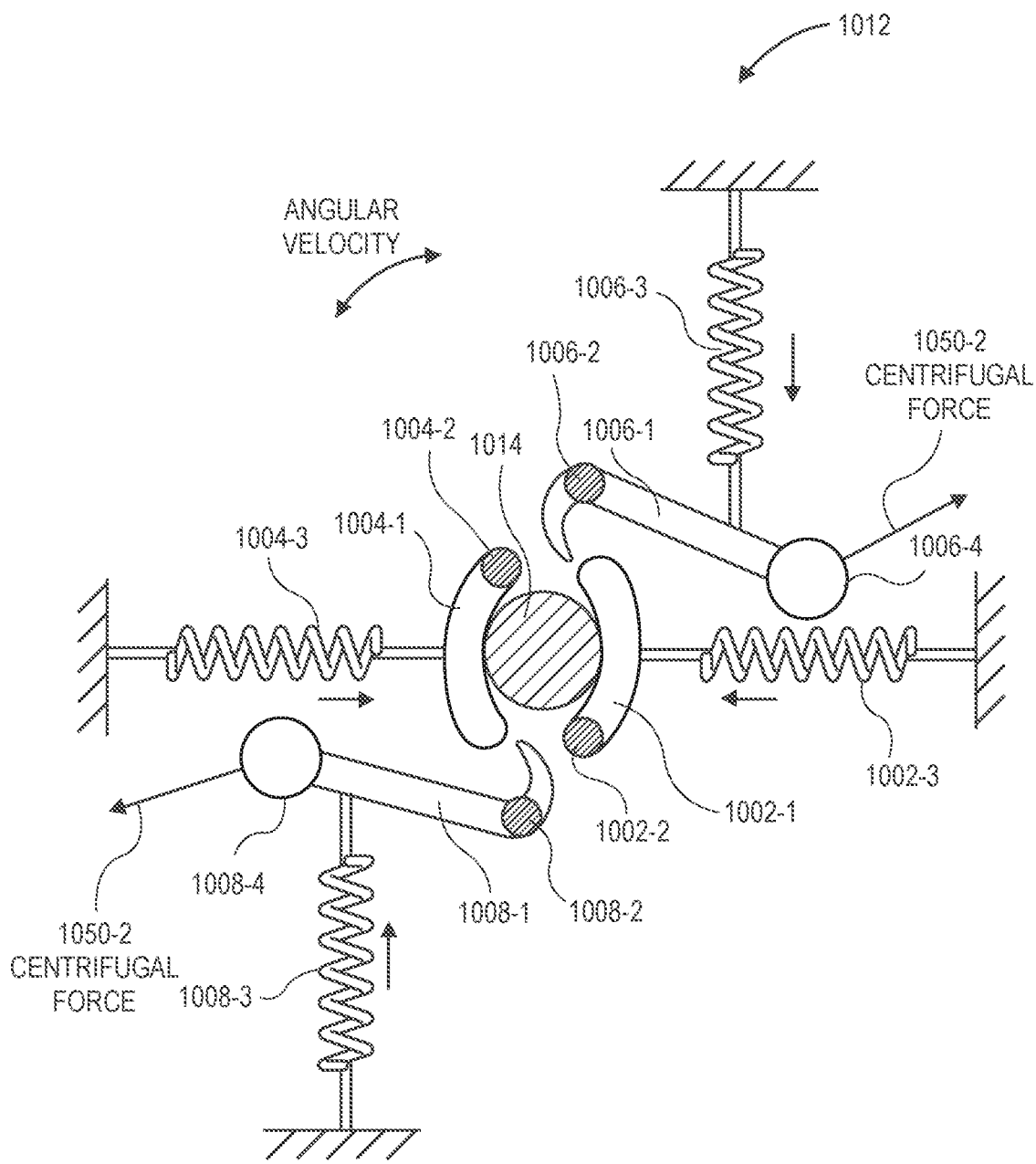
FIG. 10B is a diagram of the RPM dependent clutch in an engaged position that occurs during low revolutions per minute of the drive shaft of the motor, in accordance with disclosed implementations.

As discussed above, the RPM dependent clutch 1012 apparatus and each of the components of the RPM dependent clutch discussed with respect to FIGS. 10A through 10B are affixed to and rotate with the drive shaft of a motor, as illustrated and discussed above. The RPM dependent clutch 1012 may include a pair of shaft clamps 1002-1, 1004-1 and a pair of levers 1006-1, 1008-1. The first shaft clamp 1002-1 is affixed to and rotates about a first pivot 1002-2, the second shaft clamp 1004-1 is affixed to and rotates about a second pivot 1004-2, the first lever 1006-1 is affixed to and rotates about a third pivot 1006-2, and the second lever 1008-1 is affixed to and rotates about a fourth pivot 1008-2. In addition, energy storage devices, such as springs 1002-3, 1004-3, 1006-3, and 1008-3, may be coupled to each of the shaft clamps 1002-1, 1004-1 and levers 1006-1, 1008-1, as illustrated to apply forces to the shaft clamps and levers to cause them to rotate about the pivots 1002-2, 1004-2, 1006-2, 1008-2 depending on the centrifugal force generated by the rotation of the motor and the attached RPM dependent clutch 1012. As discussed below, the springs 1002-3, 1004-3, 1006-3, 1008-3 compress/expand in response to centrifugal forces generated through rotation of the RPM dependent clutch as it rotates with the drive shaft of the motor to which it is affixed and store or discharge potential energy, respectively. In some implementations, as illustrated, the levers 1006-1 and 1008-2 may also include one or more masses 1006-4 and 1008-4 to increase the forces acting on those springs and the resulting lever action. While the example illustrated with respect to FIGS. 10A through 10B utilize springs, in other implementations, the energy storage devices may include pistons, magnets, etc.

In example illustrated in FIG. 10A, when the drive shaft of the motor to which the RPM dependent clutch 1012 apparatus is attached is rotating at high RPM above the low RPM range to allow accurate indirect measurement of the RPMs of the motor through back-EMF of the motor, the centrifugal forces 1050-1 generated by the rotation causes the springs 1006-3 and 1008-3 to compress which causes the levers 1006-1 and 1008-1 to rotate into a clamp contact position in which the levers contact the shaft clamps and pull the shaft clamps 1002-1 and 1004-1 away from the engageable shaft 1014 of the SLMR apparatus, thereby disengaging the engageable shaft 1014.

Through use of the levers 1006-1 and 1008-1, the RPM dependent clutch 1012 may include stronger springs 1002-3, 1004-3, or other energy storage devices, on the shaft clamps 1002-1, 1004-1 to yield a strong clamping/gripping force on the engageable shaft at low RPMs yet still disengagement of the shaft at higher RPMs. For example, the levers 1006-1, 1008-1 engage and pry the shaft clamps 1002-1, 1004-1 away from the engageable shaft 1014 as the centrifugal forces 1050-1 acting on the masses 1006-4, 1008-4 of the levers compresses the springs 1006-3, 1008-3. By adjusting the strength of the springs 1006-3, 1008-3 and/or the weight of the masses 1006-4, 1008-4 the point at which the shaft clamps 1002-1, 1004-1 are contacted/released may be adjusted independent of the strength of the springs 1002-3, 1004-3. Accordingly, the low RPM range may vary based on the strength of the energy storage devices utilized on the RPM dependent clutch 1012 apparatus.

Referring now to FIG. 10B, illustrated is a diagram of the RPM dependent clutch 1012 of the SLMR apparatus discussed above with respect to FIGS. 8 through 9 in an engaged position that occurs during the low RPM range of the drive shaft of the motor to which the SLMR apparatus is attached, in accordance with disclosed implementations.

As discussed above, based on the strength of the springs 1006-3, 1008-3 and the weight of the masses 1006-4, 1008-4, as the RPM of the drive shaft of the motor to which the SLMR apparatus is attached decrease and enters the low RPM range, causing the centrifugal forces 1050-2 acting on the masses to decrease, the springs 1006-3, 1008-3 expand causing the levers 1006-1, 1008-1 to rotate about pivots 1006-2, 1008-2 and into the lever release position in which the levers release the shaft clamps 1002-1, 1004-1. Upon release of the shaft clamps 1002-1, 1004-1, the springs 1002-3, 1004-3 expand and cause the shaft clamps 1002-1, 1004-1 to rotate about pivots 1002-2, 1004-2 into the engaged position to engage with and rotate the engageable shaft 1014 of the SLMR apparatus such that the engageable shaft 1014 rotates with the rotation of the drive shaft and the RPM dependent clutch 1012. As illustrated, the clamping force applied to the engageable shaft 1014 is dependent upon the forces of springs 1002-3, 1004-3.

Figure 10C:
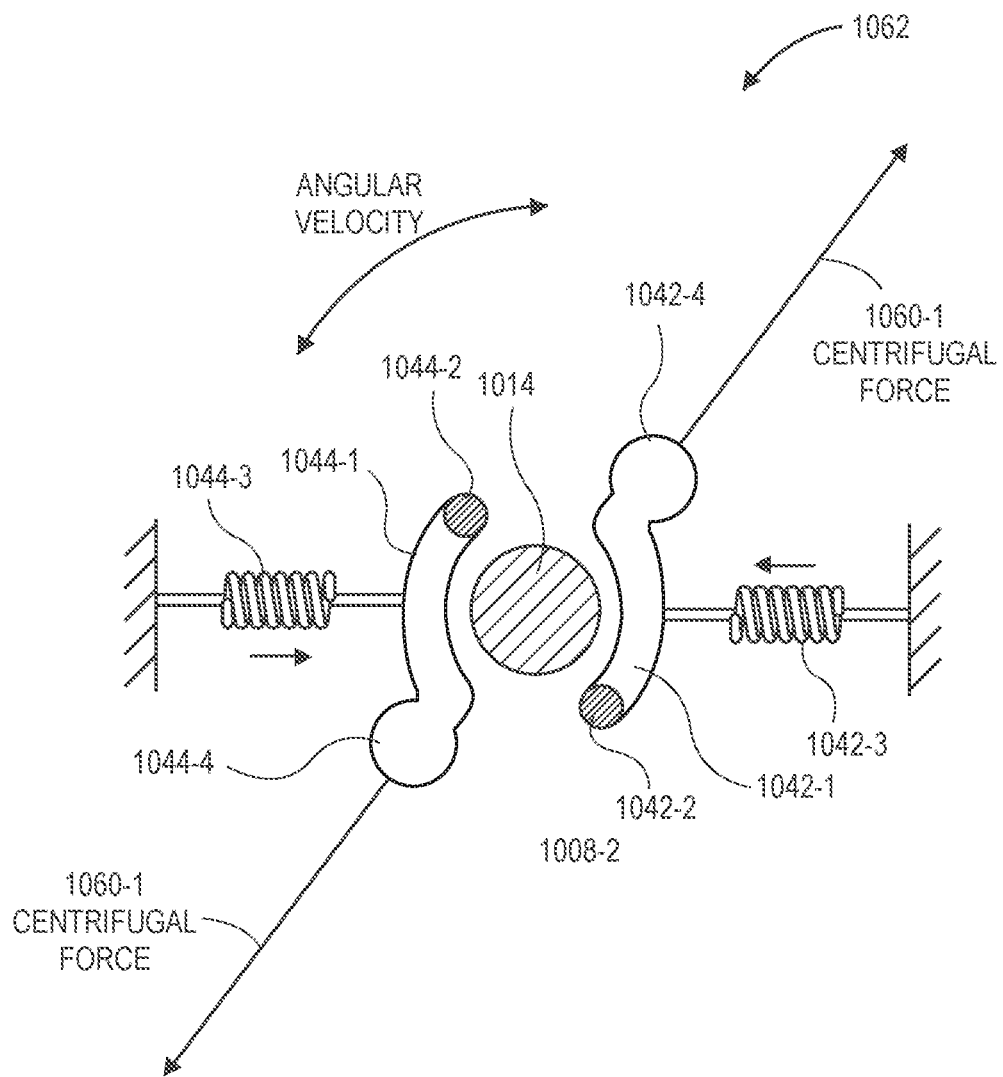
FIG. 10C is a diagram of another RPM dependent clutch of the sensor-less motor reversal apparatus in a disengaged position that occurs during high revolutions per minute of the drive shaft of the motor, in accordance with disclosed implementations.

FIG. 10C is a diagram of another RPM dependent clutch 1062 apparatus of the sensor-less motor reversal apparatus illustrated in FIGS. 8 and 9 in a disengaged position that occurs during high RPMs of the drive shaft, in accordance with disclosed implementations. In the particular example illustrated in FIGS. 10C and 10D, the RPM dependent clutch is a mechanically driven inverted centrifugal clutch that causes engagement at low RPM of the drive shaft to which the inverted centrifugal clutch is coupled, and disengagement at higher RPM. While the example discussed with respect to FIGS. 10C through 10D describe the RPM dependent clutch as an inverted centrifugal clutch, in other implementations, the RPM dependent clutch may be electromagnetically controlled, electrically controlled, etc.

Figure 10D:
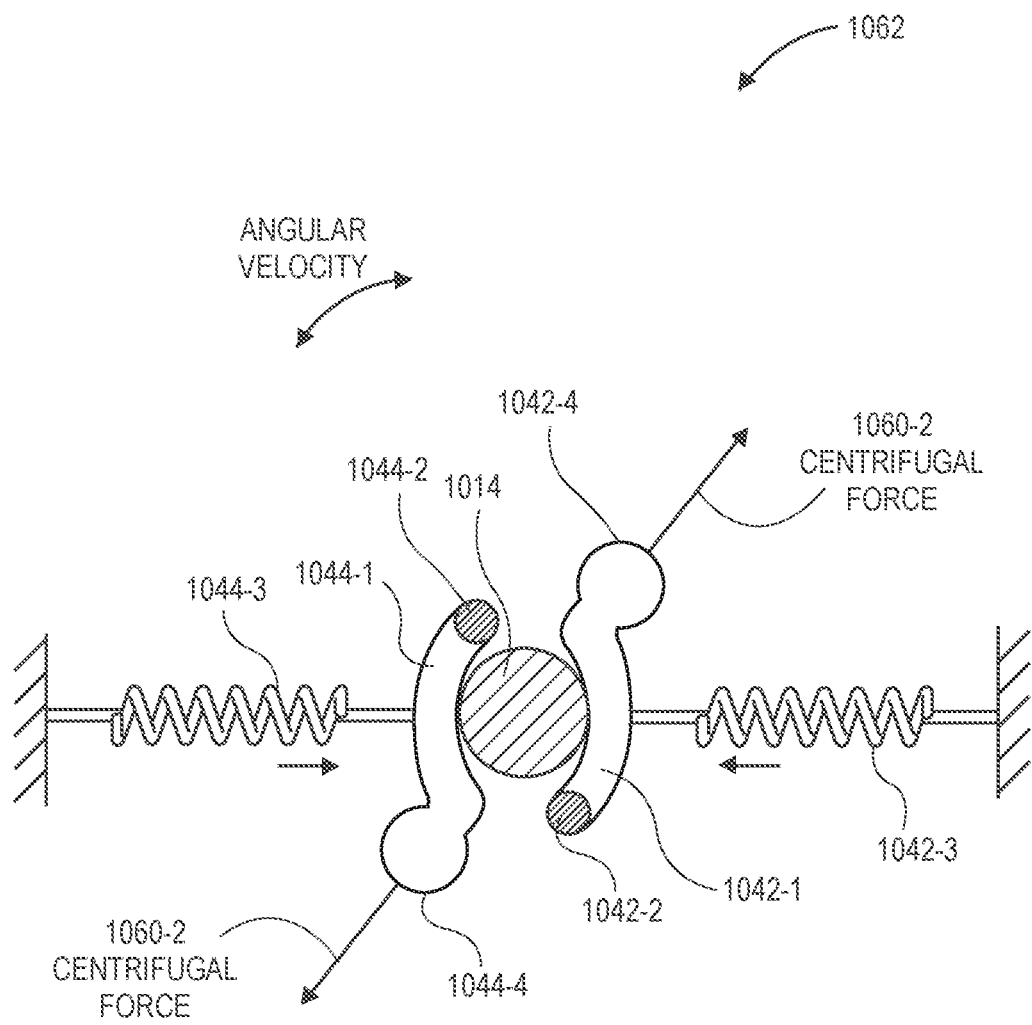
FIG. 10D is a diagram of the RPM dependent clutch illustrated in FIG. 10C in an engaged position that occurs during low revolutions per minute of the drive shaft of the motor, in accordance with disclosed implementations.

As discussed above, the RPM dependent clutch 1062 apparatus and each of the components of the RPM dependent clutch discussed with respect to FIGS. 10C through 10D are affixed to and rotate with the drive shaft of a motor, as illustrated and discussed above. The RPM dependent clutch 1062 may include a pair of shaft clamps 1042-1, 1044-1. The first shaft clamp 1042-1 is affixed to and rotates about a first pivot 1042-2 and the second shaft clamp 1044-1 is affixed to and rotates about a second pivot 1044-2. In addition, energy storage devices, such as springs 1042-3 and 1044-3 may be coupled to each of the shaft clamps 1042-1, 1044-1, as illustrated, to apply forces to the shaft clamps to cause them to rotate about the pivots 1042-2, 1044-2 depending on the centrifugal force 1060-1 generated by the rotation of the motor and the attached RPM dependent clutch 1062. As discussed below, the springs 1042-3, 1044-3 compress/expand in response to centrifugal forces generated through rotation of the RPM dependent clutch as it rotates with the drive shaft of the motor to which it is affixed and store or discharge potential energy, respectively. In some implementations, as illustrated, the first shaft clamp 1042-1 and the second shaft claim 1044-1 may also include one or more masses 1006-4 and 1008-4 at an opposing end from the pivots 1042-2, 1044-2 to increase the forces acting on the springs 1042-3, 1044-3. While the example illustrated with respect to FIGS. 10C through 10D utilize springs, in other implementations, the energy storage devices may include pistons, magnets, etc.

In example illustrated in FIG. 10C, when the drive shaft of the motor to which the RPM dependent clutch 1062 apparatus is attached is rotating at high RPM outside the low RPM range to allow accurate indirect measurement of the RPMs of the motor through back-EMF of the motor, the centrifugal forces 1060-1 acting on the masses 1042-3, 1044-4 generated by the rotation causes the springs 1042-3 and 1044-3 to compress, which pulls the clamps 1042-1, 1044-1 away from the engageable shaft 1014 of the SLMR apparatus, thereby disengaging the engageable shaft 1014.

Through use of the masses 1042-4, 1044-4 on the shaft clamps 1042-1, 1044-1, the RPM dependent clutch 1062 may include stronger springs 1042-3, 1044-3, or other energy storage devices, on the shaft clamps 1042-1, 1044-1 to yield a stronger clamping/gripping force on the engageable shaft at low RPMs yet still disengagement of the shaft at higher RPMs. By adjusting the strength of the springs 1042-3, 1044-3 and/or the weight of the masses 1042-4, 1044-4 the point at which the shaft clamps 1042-1, 1044-1 engage/disengage the shaft 1014 may be adjusted. Accordingly, the low RPM range may vary based on the strength of the energy storage devices utilized on the RPM dependent clutch 1062 apparatus.

Referring now to FIG. 10D, illustrated is a diagram of the RPM dependent clutch 1062 of the SLMR apparatus discussed above with respect to FIGS. 8 through 9 in an engaged position that occurs during the low RPM range of the drive shaft of the motor to which the SLMR apparatus is attached, in accordance with disclosed implementations.

As discussed above, based on the strength of the springs 1042-3, 1044-3 and the weight of the masses 1042-4, 1044-4, as the RPM of the drive shaft of the motor to which the SLMR apparatus is attached decrease and enters the low RPM range, causing the centrifugal forces 1060-2 acting on the masses to decrease, the springs 1042-3, 1044-3 expand causing the shaft clamps 1042-1, 1044-1 to pivot about the pivot points 1042-2, 1044-2 and engage the shaft 1014.

As illustrated in FIGS. 10A through 10D, the RPM dependent clutch is operable to engage the engageable shaft 1014 at low RPMs of the drive shaft of the motor to which the SLMR apparatus is attached and disengage the engageable shaft at higher RPMs, regardless of the direction of rotation of the drive shaft. While the RPM dependent clutch is described with respect to a DC motor and engagement/disengagement of an engageable shaft of an SLMR apparatus, the RPM dependent clutch described herein is operable with any type of motor, may function independent of the SLMR apparatus and may be used to cause engagement at low RPM and disengagement at high RPM of any type of motor or device.

Figure 11:
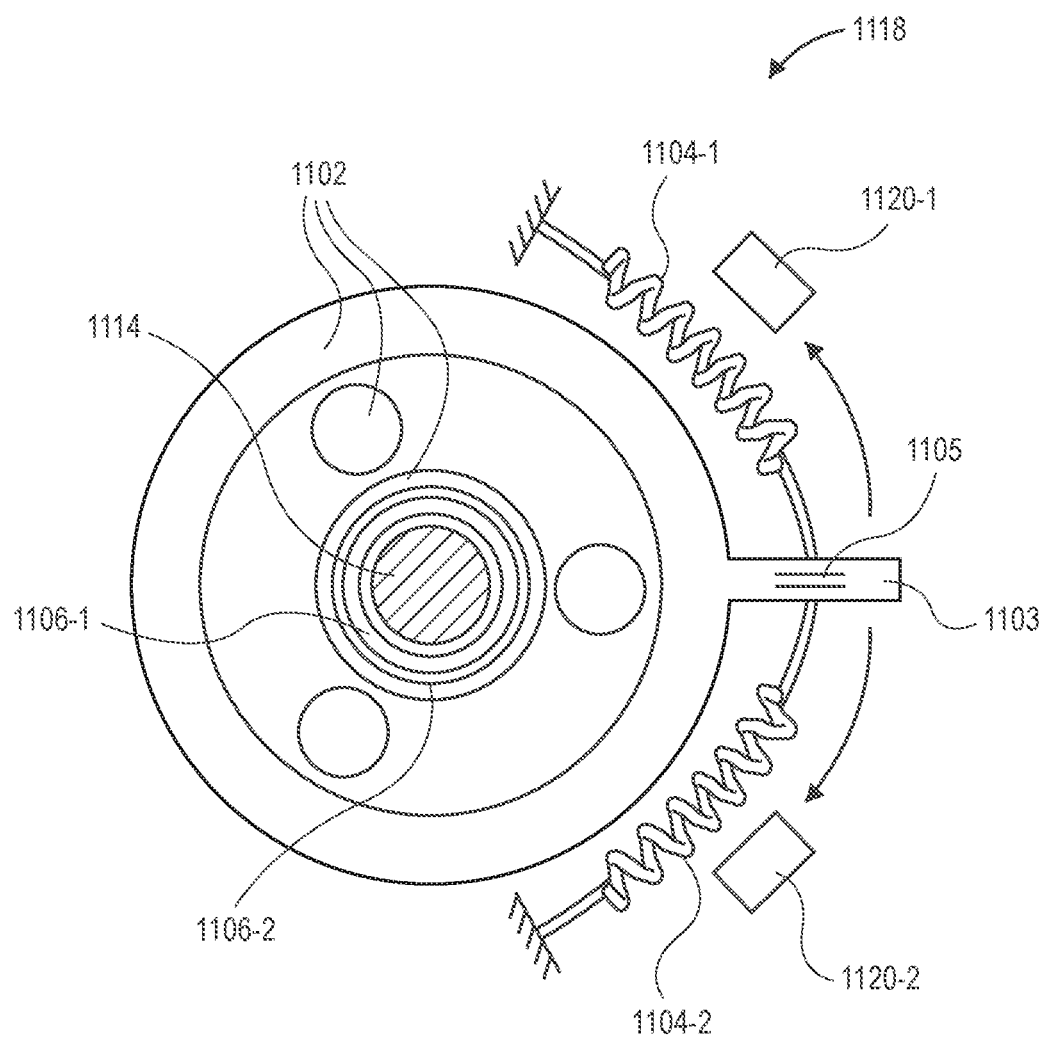
FIG. 11 is a diagram of the energy storage mechanism of the sensor-less motor reversal apparatus, in accordance with the disclosed implementations.

FIG. 11 is a diagram of the energy storage mechanism 1118 of the SLMR apparatus discussed herein, in accordance with the disclosed implementations. The energy storage mechanism 1118 corresponds to energy storage mechanism 918 illustrated in FIG. 9.

As discussed above, the energy storage mechanism 1118 is coupled to the engageable shaft 1114 through an energy storage mechanism torque limiter 1106 that includes an inner race 1106-1 that is affixed to and rotates with the engageable shaft 1114 and an outer race 1106-2 that is affixed to a gearing mechanism 1102, such as a planetary gear system, of the energy storage mechanism 1118.

At low RPMs when the engageable shaft 1114 is engaged and rotated by the RPM dependent clutch, as discussed above, the engageable shaft 1114 rotates the gearing mechanism 1102 and thus the energy storage mechanism 1118 in the same direction as the rotation of the engageable shaft 1114. The gearing mechanism 1102 may include a series of gears to reduce/adjust the rotation and mechanical advantage of the energy storage mechanism with respect to the rotation of the engageable shaft 1114 to allow sufficient loading and engagement of the energy storage mechanism by a one-way latch 1120-1, 1120-2, as discussed.

While the example discussed with respect to FIG. 11 includes a gearing mechanism 1102, in other implementations, other systems may be used to enable rotation of the energy storage mechanism with respect to the engageable shaft 1114. In still other implementations, the gearing mechanism 1102 may be omitted from the energy storage mechanism 1118 and may be coupled to the engageable shaft 1114 via the energy storage mechanism torque limiter 1106.

As the energy storage mechanism 1118 rotates, for example in a counterclockwise rotation toward the one-way latch 1120-1, spring 1104-1 compresses and spring 1104-2 expands, thereby storing energy in the springs 1104-1, 1104-2. As the energy storage mechanism 1118 continues to rotate, the energy storage mechanism arm 1103 also rotates into the one-way latch 1120-1 which engages the energy storage mechanism arm 1103 and prevents the energy storage mechanism 1118 from rotating back to neutral while engaged. In some implementations, the energy storage mechanism arm 1103 may also include one or more grooves 1105 that are configured to allow engagement by the one-way latch 1120. The one-way latches 1120-1, 1120-2 also include stops that prevent the energy storage mechanism from continuing to rotate past the one-way latch 1120-1, 1120-2 and stopping the springs 1104-1, 1104-2 from loading further.

To reach the position at which the energy storage mechanism arm 1103 is latched and held by the one-way latch 1120, the threshold of the energy storage mechanism torque limiter 1106 must be higher than the torque imparted by the springs 1104-1, 1104-2. Once the stop of the one-way latch is hit by the energy storage mechanism arm 1103 the torque imparted on the engageable shaft 1114 is equal to the threshold of the energy storage mechanism torque limiter 1106 such that the engageable shaft slips and is allowed to continue rotating while the energy storage mechanism is retained and held in position by the one-way latch 1120.

The springs 1104-1, 1104-2 may be designed such that the springs 1104-1, 1104-2 load lightly during initial displacement of the springs and more heavily as the one-way latch 1120 is approached by the energy storage mechanism arm 1103. With this configuration, the motor to which the SLMR apparatus is attached is allowed to gain enough RPM to generate sufficient back-EMF to allow for accurate monitoring through back-EMF. This sequence is illustrated and discussed further below with respect to FIG. 13.

As illustrated in FIG. 11, the energy storage mechanism 1118 is configured to rotate in either direction, store potential energy in the springs 1104-1, 1104-2 and engage and be held by either the one-way latch 1120-1 or 1120-2. With this illustrated configuration, and as discussed further below, the energy storage mechanism is operable to retain potential energy that may be released to aid the transition of the motor though the low RPM range, regardless of the direction of rotation of the drive shaft of the motor to which the SLMR apparatus is attached.

While the energy storage mechanism 1118 discussed with respect to FIG. 11 includes springs that are used to store and discharge potential energy, in other implementations other forms of energy storage devices may be used instead of or in addition to springs (e.g., gas pistons, magnets, etc.). Likewise, while the example discussed with respect to FIG. 11 includes two springs, in other implementations fewer or additional springs and/or other energy storage devices may be included in the energy storage mechanism and used to store and discharge potential energy, in accordance with the disclosed implementations.

Figure 12:
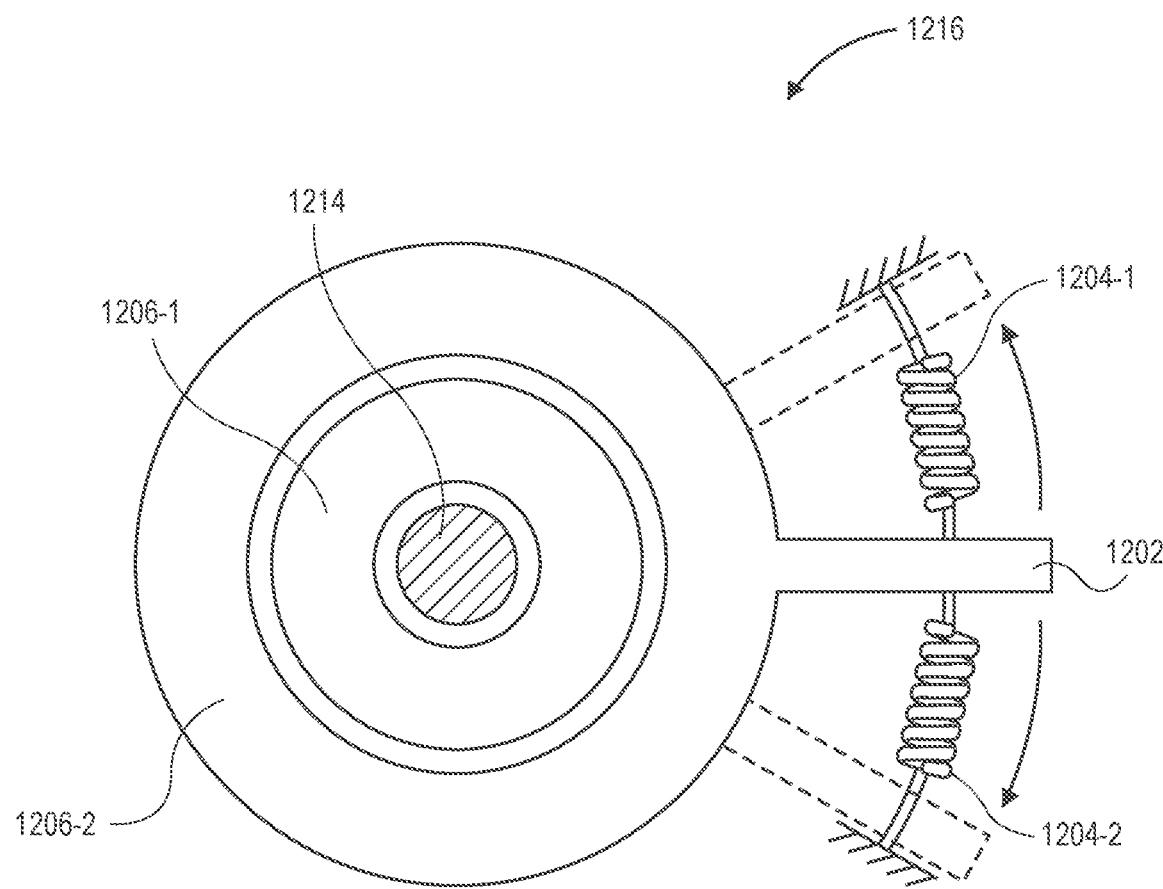
FIG. 12 is a diagram of the latch release mechanism of the sensor-less motor reversal apparatus, in accordance with the disclosed implementations.

FIG. 12 is a diagram of the latch release mechanism 1216 of the SLMR apparatus discussed herein, in accordance with the disclosed implementations. The latch release mechanism 1216 corresponds to the latch release mechanism 916 of FIG. 9.

The latch release mechanism 1216 is coupled to the engageable shaft 1214 by a latch release torque limiter 1206 that includes an inner race 1206-1 that is coupled to and rotates with the engageable shaft 1214 and an outer race 1206-2 that is coupled to and rotates with the latch release mechanism 1216. In some implementations, in comparison to the torque limiter of the energy storage mechanism discussed above, the latch release torque limiter 1206 is much weaker than the torque limiter of the energy storage mechanism. Likewise, the springs 1204-1, 1204-2 and/or other energy storage device may be much weaker than the springs and/or other energy storage devices of the energy storage mechanism discussed above.

Similar to the energy storage mechanism, the latch release mechanism 1216 rotates with rotation of the engageable shaft 1214 and in the same direction as the engageable shaft 1214. However, because the latch release mechanism 1216 may include weaker springs 1204-1, 1202-2 than the springs of the energy storage mechanism 1118 discussed above with respect to FIG. 11, and/or either different gearing of a gearing mechanism, or no gearing mechanism as illustrated in FIG. 12, the latch release arm 1202 rotates, contacts and passes the one-way latch 1120 (FIG. 11) before the one-way latch engages the energy storage mechanism 1118. Because the latch release arm 1202 rotates, contacts and passes the one-way latch before the energy storage mechanism reaches the one-way latch, the one-way latch is able to engage and hold the energy storage mechanism in place.

As the springs 1204-1, 1204-2 load, increasing the torque on the engageable shaft 1214, the threshold of the latch release torque limiter 1206 is reached and the latch release slips and allows the engageable shaft 1214 to continue to rotate and increase in RPM. Once the motor to which the SLMR apparatus is attached has increased in RPM to a point at which the engageable shaft is disengaged by the RPM dependent clutch, the engageable shaft stops rotation and the springs 1204-1, 1204-2 rotate the latch release mechanism 1216 back past the one-way latch 1120 and to a neutral position. As discussed above with respect to FIG. 9, because the release plate of the one-way latch is allowed to pivot freely in one direction, when the latch release arm 1202 moves back to neutral and contacts the back of the release plate 923 of the one-way latch, the latch release arm is allowed to pass through the one way latch and return to neutral without causing the latch release to disengage the energy storage mechanism.

While the example latch release mechanism 1216 discussed with respect to FIG. 12 includes springs, in other implementations other forms of energy storage devices may be used instead of or in addition to the springs 1204-1, 1204-2. Likewise, while the example discussed with respect to FIG. 12 includes two springs, in other implementations fewer or additional springs and/or other energy storage devices may be included in the latch release mechanism.

As discussed, during startup of the motor to which the SLMR apparatus is attached, the SLMR apparatus gathers and stores energy in the energy storage mechanism which is engaged and held in place by a one-way latch. As the RPM of the motor continues to increase, the RPM dependent clutch disengages the engageable shaft allowing the motor to continue operation as normal, while the energy storage mechanism retains the stored energy. At this point, the SLMR apparatus is loaded and ready to aid in the transition of the rotation of the shaft of the motor to which the SLMR apparatus is attached from a positive direction to a negative direction, or a negative direction to a positive direction.

When the motor is reversing direction, the RPM of the motor slows to a point at which the RPM dependent clutch re-engages the engageable shaft. Upon engagement of the engageable shaft, the latch release again rotates with the direction of rotation of the engageable shaft and engages the release plate of the one-way latch causing the one-way latch to rotate from an engaged position to an open position, as discussed above, and disengage the energy storage mechanism 1118 that is held by the one-way latch. The one-way latch does not re-latch until the energy storage mechanism 1118 has been released. For example, as discussed above, the one-way latch may include an ejection device 926 and/or other device(s) that shifts the position of the energy storage mechanism so that it will not be re-latched by the one-way latch prior to discharge of the energy. Likewise, similar to initial loading, the latch release arm 1202 continues past the one-way latch and rotates until the threshold of the latch release torque limiter 1206 is reached.

As the RPM of the motor continues to decrease, the energy storage mechanism of the torque limiter slips until its torque threshold is reached at which point it applies torque in the direction that is opposite the direction of rotation of the drive shaft and engaged engageable shaft. As a result, the drive shaft and engaged engageable shaft passively slow to zero RPM, at which point the springs 1104-1, 1104-2 discharge the stored potential energy causing the engageable shaft and the drive shaft to begin rotating in the opposite direction. The stored potential energy of the energy storage mechanism 1118 that is discharged causes sufficient rotation of the engaged engageable shaft and the drive shaft in the opposite direction such that the RPMs of the drive shaft in the opposite direction are sufficient to allow accurate measurement of the RPM via back-EMF of the motor and the motor can accurately control and continue increasing the RPMs of the motor in the opposite direction.

As the motor continues to increase the RPMs of the drive shaft in the opposite direction, in the same manner as discussed above, the SLMR apparatus reloads in the opposite direction with the energy storage mechanism loading and latching with the other one-way latch 1120-2. Likewise, as the RPM of the motor increases beyond the low RPM range, the centrifugal clutch again disengages the engageable shaft, the motor operates as normal in the reverse direction, the latch release returns to neutral, and the SLMR apparatus is again loaded and ready to aid in the transition of the drive shaft rotation from a reverse direction back to the positive direction. The process of transitioning from positive to negative rotation is further illustrated and discussed below with respect to FIG. 13.

When the motor shuts down, for example, following a landing of the aerial vehicle, the motor RPMs slow, the RPM dependent clutch re-engages releasing energy stored by the energy storage mechanism, as discussed above. However, because the motor does not apply torque in the opposite direction to further increase the RPM of the drive shaft in that opposite direction, the energy storage mechanism of the SLMR apparatus does not reload and the apparatus comes to rest. Because the SLMR is not reloaded at shutdown, the SLMR apparatus is completely state-less in that the SLMR apparatus can startup in either direction, regardless of prior motor operation.

As discussed, the SLMR apparatus aids the transition of a motor from positive RPM to negative RPM, or from negative RPM to positive RPM, through the low RPM range at which back-EMF cannot be used to reliably measure the RPM of the motor.

Figure 13:
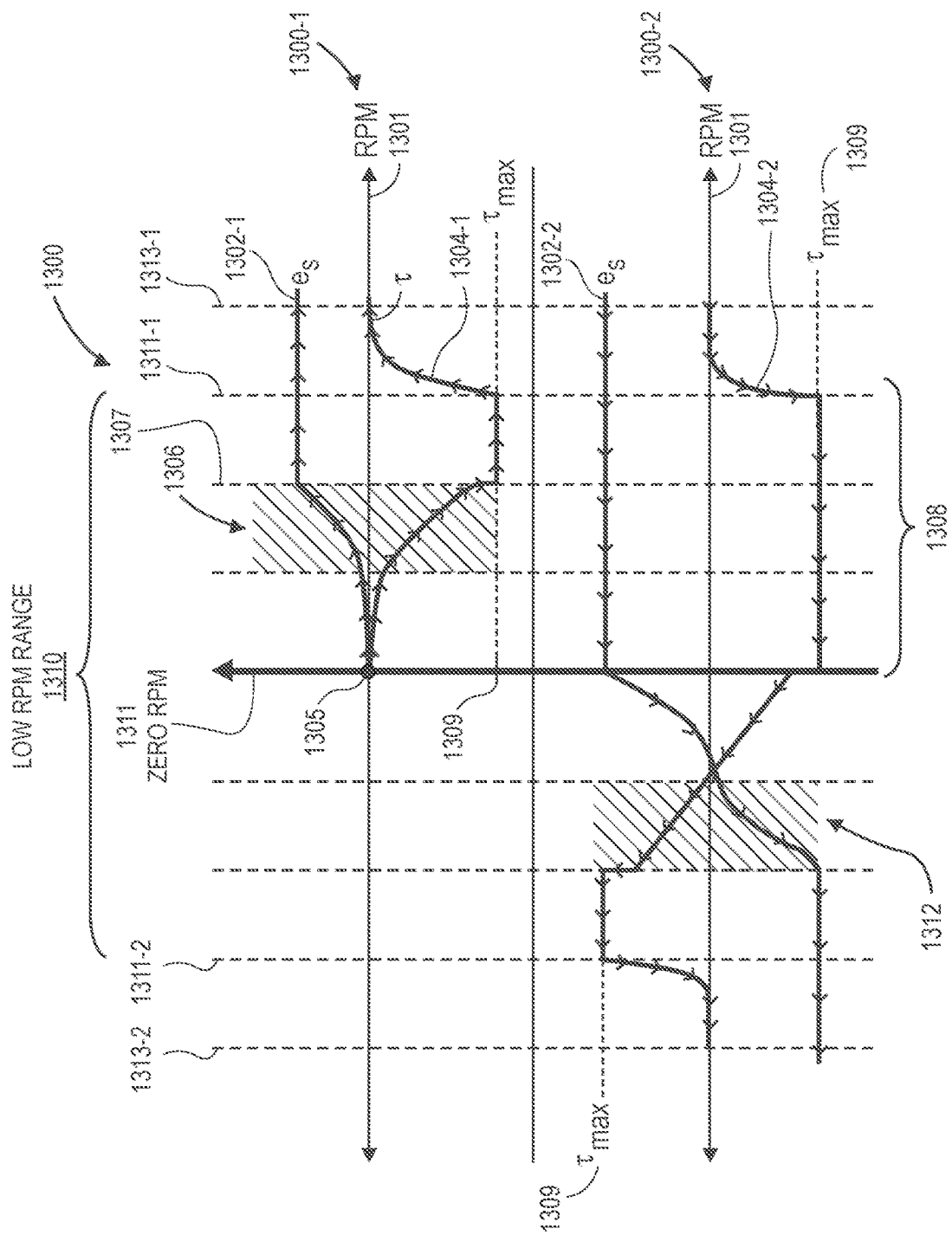
FIG. 13 is a graph illustrating the startup and reversal sequences of the sensor-less motor reversal apparatus, in accordance with the disclosed implementations.

FIG. 13 is a graph illustrating the startup and reversal sequences 1300 of an example SLMR apparatus, in accordance with the disclosed implementations.

The x-axis 1301 illustrates the RPM of the drive shaft of the motor to which the SLMR apparatus is affixed, with positive RPM to the right of the vertical y-axis 1311, which represents zero RPM, and negative RPM to the left of the vertical y-axis 1311.

Referring first to the upper quadrant 1300-1, which illustrates initial motor startup, line 1302-1 illustrates the potential energy stored by the energy storage mechanism of the SLMR apparatus and the line 1304-1 illustrates the torque of the energy storage mechanism torque limiter. At zero RPM 1305, when the motor has not started (initial startup), there is no energy stored by the energy storage mechanism and there is no torque applied to the energy storage mechanism torque limiter.

At initial startup of the motor, as the RPMs of the motor increase from zero, potential energy is stored by the energy storage mechanism through the active loading region 1306 until the RPM increase to a point 1307 at which the energy storage mechanism has rotated into and become engaged and stopped by the one-way latch, as discussed above. Likewise, as the RPM of the motor increases and the energy storage mechanism rotates, the torque on the energy storage mechanism torque limiter increases, as illustrated by line 1304-1, again until the point 1307 at which the energy storage mechanism is engaged and stopped by the one way latch and the threshold 1309 of energy storage mechanism torque limiter is reached. As illustrated, once the energy storage mechanism is engaged by the one-way latch, even though the RPM of the drive shaft of the motor to which the SLMR apparatus is attached continues to increase, the stored energy ($e_s$) remains constant as the energy storage mechanism is held by the one-way latch and the energy storage mechanism apparatus allows the engageable shaft to continue to rotate and eventually be disengaged by the RPM dependent clutch, as discussed above. In the illustrated example, when the RPM of the drive shaft reaches 1311-1 the RPM dependent clutch begins to disengage the engageable shaft as the RPM increases until 1313-1 where the RPM dependent clutch has fully disengaged the engageable shaft. As illustrated, when the RPM dependent clutch disengages the engageable shaft at 1311-1, the torque of the engageable shaft torque limiter decreases back to zero because the engageable shaft stops rotating.

At this point the SLMR apparatus is loaded and ready to discharge the potential energy to aid the motor in transition through the low RPM range of a motor direction reversal.

Referring now to the lower quadrant 1300-2, when a motor reverse is to occur, the RPM of the motor to which the SLMR apparatus is attached begins to slow and at point 1313-1 the RPM dependent clutch begins to re-engage the engageable shaft. As re-engagement of the engageable shaft begins, as discussed above, the latch release mechanism rotates and contacts the release plate of the one-way latch releasing the energy storage mechanism. In addition, the torque of the energy storage mechanism quickly returns to the threshold ($\tau_{max}$) 1309, as illustrated by line 1304-2, because the energy storage mechanism is against the stop of the one-way latch. Because the energy storage mechanism is already loaded and held by the one-way latch, the potential energy remains stored as the RPM of the drive shaft decreases, as illustrated by line 1302-2. During this portion of the low RPM range 1310, the energy storage mechanism torque limiter passively brakes the rotation of the engaged engageable shaft and the drive shaft of the motor until the RPM of the drive shaft and engaged engageable shaft reach zero RPM 1311. As illustrated, during passive breaking 1308, the stored energy 1302-2 of the energy storage mechanism remains stored because the engaged engageable shaft and the drive shaft are still rotating in the positive direction.

When the RPM of the engaged engageable shaft and the drive shaft reach zero RPM 1311, the torque of the energy storage mechanism torque limiter transitions below the threshold 1309 and the energy stored in the energy storage mechanism releases in the low RPM range 1310 causing the motor to quickly increase in RPM and pass through the low RPM range 1310 into the negative rotational direction.

As the motor passes out of the low RPM range 1310, measurement of the motor RPM via the back-EMF of the motor again becomes reliable and the motor continues to increase the RPM of the drive shaft in the negative direction. As the RPM increase in the negative direction, the energy storage mechanism rotates in the negative direction, increasing stored energy through the active loading region 1312, until it engages and is held by the other one-way latch, again storing energy that may be used to aid in transition of the motor from negative rotation to positive rotation. Likewise, the torque of the energy storage mechanism torque limiter increases until the threshold 1309 is reached and then discharges when the RPM of the motor in the negative direction reach a point 1311-2 at which the RPM dependent clutch disengages with the engageable shaft.

Figure 14:
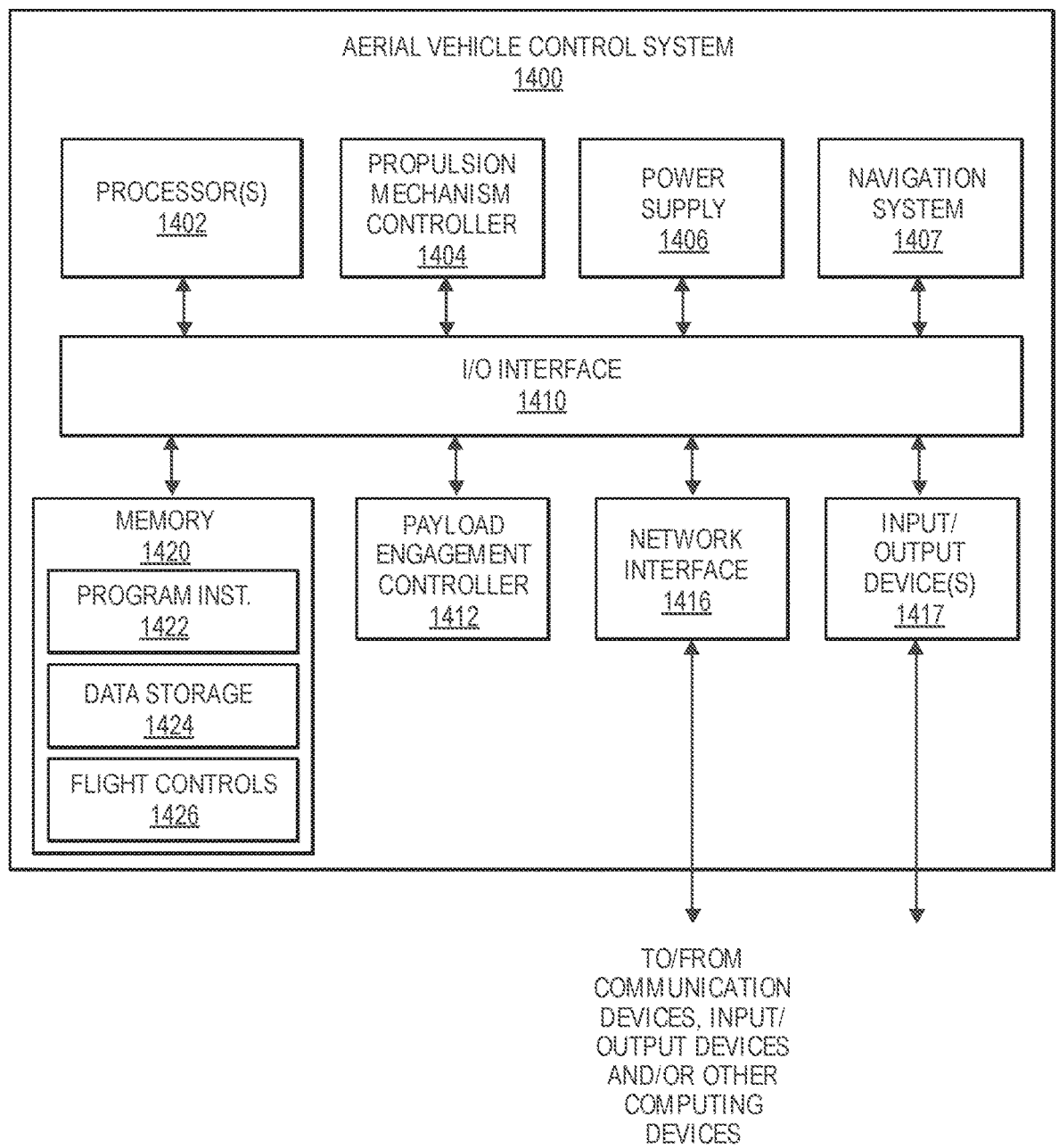
FIG. 14 is a block diagram illustrating various components of an example aerial vehicle control system, in accordance with disclosed implementations.

FIG. 14 is a block diagram illustrating various components of an example aerial vehicle control system 1400, in accordance with disclosed implementations.

In the illustrated implementation, the aerial vehicle control system 1400 includes one or more processors 1402, coupled to a memory, e.g., a non-transitory computer readable storage medium 1420, via an input/output (I/O) interface 1410. The aerial vehicle control system 1400 also includes propulsion mechanism controllers 1404, such as electronic speed controls (ESCs) or motor controllers, power modules 1406 and/or a navigation system 1407. The aerial vehicle control system 1400 further includes a payload engagement controller 1412, a network interface 1416, and one or more input/output devices 1417.

In various implementations, the aerial vehicle control system 1400 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, flight paths, flight control parameters, center of gravity information, and/or data items accessible by the processor(s) 1402. In various implementations, the non-transitory computer readable storage medium 1420 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and flight controls 1426, respectively. In other implementations, program instructions, data, and/or flight controls may be received, sent, or stored upon different types of computer-accessible media, such as non-transitory media, or on similar media separate from the non-transitory computer readable storage medium 1420 or the aerial vehicle control system 1400. Generally speaking, a non-transitory, computer readable storage medium may include storage media or memory media such as magnetic or optical media, e.g., disk or CD/DVD-ROM, coupled to the aerial vehicle control system 1400 via the I/O interface 1410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface or other peripheral interfaces, such as input/output devices 1417. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The propulsion mechanism controllers 1404 may communicate with the navigation system 1407 and adjust the rotational speed, position, orientation, or other parameters of each propulsion mechanism to stabilize the aerial vehicle, and/or to perform one or more maneuvers and guide the aerial vehicle along a flight path and/or to a safe landing location. In some implementations, there is no communication necessary between the SLMR apparatus discussed herein and any of the propulsion mechanism controllers 1404, flight controller, ESCs, etc. In other implementations, some knowledge by one or more of the propulsion mechanism controller, flight controller, and/or ESCs as to how the SLMR apparatus will affect the RPM of a motor during the low RPM range may be provided. Regardless of implementation, communication between the SLMR apparatus and any other component of the aerial vehicle is not necessary.

The navigation system 1407 may include a global positioning system (GPS), indoor positioning system (IPS), or other similar system and/or sensors that can be used to navigate the aerial vehicle to and/or from a location. The payload engagement controller 1412 communicates with the actuator(s) or motor(s) (e.g., a servo motor) used to engage and/or disengage items.

The network interface 1416 may be configured to allow data to be exchanged between the aerial vehicle control system 1400, other devices attached to a network, such as other computer systems (e.g., remote computing resources), and/or with aerial vehicle control systems of other aerial vehicles. For example, the network interface 1416 may enable wireless communication between the aerial vehicle and an aerial vehicle control system that is implemented on one or more remote computing resources. For wireless communication, an antenna of the aerial vehicle or other communication components may be utilized. As another example, the network interface 1416 may enable wireless communication between numerous aerial vehicles. In various implementations, the network interface 1416 may support communication via wireless general data networks, such as a Wi-Fi network. For example, the network interface 1416 may support communication via telecommunications networks, such as cellular communication networks, satellite networks, and the like.

Input/output devices 1417 may, in some implementations, include one or more displays, imaging devices, thermal sensors, infrared sensors, time of flight sensors, accelerometers, pressure sensors, weather sensors, etc. Multiple input/output devices 1417 may be present and controlled by the aerial vehicle control system 1400. One or more of these sensors may be utilized to detect failures or faults, control wingborn or VTOL flight, effect transitions between wingborn and VTOL configurations, identify safe landing locations, and/or any other operations or functions described herein.

As shown in FIG. 14, the memory may include program instructions 1422, which may be configured to implement the example routines and/or sub-routines described herein. The data storage 1424 may include various data stores for maintaining data items that may be provided for determining flight paths, landing, altering motor rotation direction, identifying locations for disengaging items, determining which propulsion mechanisms to utilize to execute a maneuver, determining which propulsion mechanism to reverse, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1400 is merely illustrative and is not intended to limit the scope of the present disclosure. In particular, the computing system and devices may include any combination of hardware or software that can perform the indicated functions. The aerial vehicle control system 1400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1400. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1400 may be transmitted to the aerial vehicle control system 1400 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water-based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

It should be understood that, unless otherwise explicitly or implicitly indicated herein, any of the features, capacities, attributes, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementation as defined by the appended claims. Also, the drawings herein are not drawn to scale.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. An apparatus, comprising:
   an engageable shaft that is coaligned with a drive shaft of a brushless DC motor of an unmanned aerial vehicle ("UAV"), wherein the brushless DC motor is operable to rotate the drive shaft in either a positive direction or a negative direction;
   an RPM dependent clutch that is coupled to and rotates with the drive shaft of the brushless DC motor and is operable to engage or disengage the engageable shaft, wherein the RPM dependent clutch engages and rotates the engageable shaft during a low revolutions per minute ("RPM") range between a negative RPM of the drive shaft and a positive RPM of the drive shaft and disengages the engageable shaft during a high RPM of the drive shaft that is not between the negative RPM and the positive RPM;
   an energy storage mechanism that is rotated by the engageable shaft from a first position to a second position when the engageable shaft is rotated in the positive direction as a result of a first engagement by the RPM dependent clutch as the RPM of the drive shaft increases from a zero RPM toward the positive RPM, wherein the energy storage mechanism stores a first energy when the energy storage mechanism is in the second position;
   a first latch, wherein the first latch engages and holds the energy storage mechanism in the second position while the RPM of the drive shaft is in the high RPM, the drive shaft is rotating in the positive direction, and the engageable shaft is disengaged by the RPM dependent clutch; and
   a latch release mechanism that is rotated by the engageable shaft from a third position to a fourth position when the engageable shaft is rotated in the positive direction as a result of a second engagement by the RPM dependent clutch as the RPM of the drive shaft decreases from the high RPM and into the low RPM range as the drive shaft is rotating in the positive direction, wherein the latch release mechanism contacts the first latch as the latch release mechanism rotates from the third position to the fourth position causing the first latch to disengage the energy storage mechanism.

2. The apparatus of claim 1, wherein:
   subsequent to the energy storage mechanism being disengaged by the first latch and while the RPM of the drive shaft is in the low RPM range, the energy storage mechanism rotates from the second position to the first position discharging the first energy stored by the energy storage mechanism, wherein the first energy discharged by the energy storage mechanism aids in a first transition of a rotation of the drive shaft from the positive direction to the negative direction.

3. The apparatus of claim 2,
   wherein the energy storage mechanism, subsequent to the discharge of the first energy stored by the energy storage mechanism, is rotated by the engageable shaft from the first position to a fifth position when the engageable shaft is rotated in the negative direction as a result of the second engagement by the RPM dependent clutch as the RPM of the drive shaft increases from zero RPM toward the negative RPM, wherein the energy storage mechanism stores a second energy when in the fifth position;
   the apparatus further comprising a second latch, wherein the second latch engages and holds the energy storage mechanism in the fifth position while the RPM of the drive shaft is in the high RPM, the drive shaft is rotating in the negative direction, and the engageable shaft is disengaged by the RPM dependent clutch; and
   wherein the latch release mechanism is rotated by the engageable shaft from the third position to a sixth position when the engageable shaft is rotated as a result of a third engagement by the RPM dependent clutch as the RPM of the drive shaft decreases from the high RPM and into the low RPM range as the drive shaft rotates in the negative direction, wherein the latch release mechanism contacts the second latch as the latch release mechanism rotates from the third position to the sixth position causing the second latch to disengage the energy storage mechanism.

4. The apparatus of claim 3, wherein:
   subsequent to the second latch disengaging the energy storage mechanism and while the RPM of the drive shaft is in the low RPM range, the energy storage mechanism rotates from the sixth position to the first position discharging the second energy stored by the energy storage mechanism, wherein the second energy discharged by the energy storage mechanism aids in a second transition of the rotation of the drive shaft from the negative direction to the positive direction.

5. The apparatus of claim 1, wherein the low RPM range includes RPMs of the drive shaft where an indirect measurement of RPM of the drive shaft through a back-EMF of the brushless DC motor is unreliable.

6. An apparatus, comprising:
   an engageable shaft that is coaligned with a drive shaft of a motor, wherein the motor is operable to rotate the drive shaft in either a positive direction or a negative direction;

an RPM dependent clutch that is coupled to and rotates with the drive shaft of the motor and is operable to engage or disengage the engageable shaft, wherein the RPM dependent clutch engages and rotates the engageable shaft during a low revolutions per minute ("RPM") range between a negative RPM of the drive shaft and a positive RPM of the drive shaft and disengages the engageable shaft during a high RPM of the drive shaft that is not between the negative RPM and the positive RPM; and an energy storage mechanism that:
rotates in the positive direction from a first position to a second position when the engageable shaft is rotating in the positive direction and increasing in RPM in the positive direction, wherein the energy storage mechanism stores a first energy when the energy storage mechanism is in the second position;
rotates in the negative direction from the second position to aid in a first transition of a rotation of the drive shaft from the positive direction to the negative direction;
rotates in the negative direction from the first position to a third position when the engageable shaft is rotating in the negative direction and increasing in RPM in the negative direction, wherein the energy storage mechanism stores a second energy when in the energy storage mechanism is in the third position; and
rotates in the positive direction from the third position to aid in a second transition of the rotation of the drive shaft from the negative direction to the positive direction.

7. The apparatus of claim 6, further comprising:
a first latch at the second position, wherein the first latch engages and holds the energy storage mechanism in the second position while the RPM of the drive shaft is in the high RPM, the drive shaft is rotating in the positive direction, and the engageable shaft is disengaged by the RPM dependent clutch; and
a second latch at the third position, wherein the second latch engages and holds the energy storage mechanism in the third position while the RPM of the drive shaft is in the high RPM, the drive shaft is rotating in the negative direction, and the engageable shaft is disengaged by the RPM dependent clutch.

8. The apparatus of claim 7, further comprising:
a latch release mechanism that:
rotates in the positive direction from a fourth position to a fifth position when the engageable shaft is rotating in the positive direction;
contacts the first latch as the latch release mechanism rotates from the fourth position to the fifth position and causes the first latch to rotate from a first latched position to a first open position;
rotates in the negative direction from the fourth position to a sixth position when the engageable shaft is rotating in the negative direction; and
contacts the second latch as the latch release mechanism rotates from the fourth position to the sixth position and causes the second latch to rotate from a second latched position to a second open position.

9. The apparatus of claim 8, the latch release mechanism further comprising:
a torque limiter that couples the latch release mechanism to the engageable shaft such that:
the latch release mechanism is rotated by the engageable shaft in either the positive direction or the negative direction when a torque of the torque limiter is below a threshold; and
the latch release mechanism does not rotate with the engageable shaft in either the positive direction or the negative direction when the torque of the torque limiter is above the threshold.

10. The apparatus of claim 8, the first latch further comprising:
at least one pivot that:
allows a release plate of the first latch to pivot so that the latch release mechanism can pass the first latch as the latch release mechanism rotates from the fifth position to the fourth position; and
causes the first latch to rotate from the first latched position to the first open position when the latch release mechanism contacts the release plate as the latch release mechanism rotates from the fourth position to the fifth position.

11. The apparatus of claim 6, the energy storage mechanism further comprising:
a torque limiter that couples the energy storage mechanism to the engageable shaft such that:
the energy storage mechanism is rotated by the engageable shaft in either the positive direction or the negative direction when a torque of the torque limiter is below a threshold.

12. The apparatus of claim 6, the energy storage mechanism further comprising:
an energy storage device that stores the first energy as potential energy as the energy storage mechanism rotates in the positive direction and discharges the first energy as the energy storage mechanism rotates in the negative direction.

13. The apparatus of claim 12, wherein the energy storage device is a spring.

14. The apparatus of claim 6, the RPM dependent clutch further comprising:
a shaft clamp operable to engage or disengage the engageable shaft; and
an energy storage device that:
stores potential energy when the RPM of the drive shaft is rotating at the high RPM and causes the shaft clamp to disengage from the engageable shaft; and
discharges the potential energy when the RPM of the drive shaft is in the low RPM range and causes the shaft clamp to engage the engageable shaft.

15. An apparatus, comprising:
an engageable shaft;
an RPM dependent clutch that is coupled to and rotates with a drive shaft of a motor and is operable to engage or disengage the engageable shaft, wherein the RPM dependent clutch engages and rotates the engageable shaft during a low revolutions per minute ("RPM") range between a negative RPM of the drive shaft and a positive RPM of the drive shaft and disengages the engageable shaft during a high RPM of the drive shaft that is not between the negative RPM and the positive RPM;
an energy storage mechanism that is rotated by the engageable shaft from a first position to a second position as a result of a first engagement of the engageable shaft by the RPM dependent clutch as the RPM of the drive shaft increases from a zero RPM toward the positive RPM, wherein the energy storage mechanism stores a potential energy while in the second position;

a latch, wherein the latch:
  engages and holds the energy storage mechanism in the second position while the RPM of the drive shaft is in the high RPM and the engageable shaft is disengaged by the RPM dependent clutch; and
  disengages the energy storage mechanism when the RPM of the drive shaft is decreasing from the high RPM toward the zero RPM such that the potential energy stored by the energy storage mechanism can discharge and aid in a transition of a rotation of the drive shaft from a positive direction to a negative direction.

16. The apparatus of claim 15, wherein the apparatus is stateless and may be initiated in either the positive direction or the negative direction.

17. The apparatus of claim 15, further comprising:
  a latch release mechanism rotated by the engageable shaft that engages the latch as the latch release mechanism rotates and causes the latch to disengage the energy storage mechanism.

18. The apparatus of claim 15, the energy storage mechanism further comprising:
  a torque limiter that couples the energy storage mechanism to the engageable shaft such that:
    the energy storage mechanism is rotated by the engageable shaft in either the positive direction or the negative direction when a torque of the torque limiter is below a threshold; and
    the energy storage mechanism does not rotate with the engageable shaft in either the positive direction or the negative direction when the torque of the torque limiter is above the threshold.

19. The apparatus claim 15, the energy storage mechanism further comprising:
  a gearing mechanism to control a rate of rotation of the energy storage mechanism with respect to the rotation of the engageable shaft.

20. The apparatus of claim 15, the RPM dependent clutch further comprising:
  at least one shaft clamp operable to engage or disengage the engageable shaft in response to a centrifugal force generated by the rotation of the drive shaft; and
  at least one lever operable to aid in a disengagement of the shaft clamp from the engageable shaft based at least in part on the centrifugal force generated by the rotation of the drive shaft.

\* \* \* \* \*